(12) United States Patent
Sierra et al.

(10) Patent No.: US 10,270,597 B2
(45) Date of Patent: *Apr. 23, 2019

(54) COMBINED AUTHORIZATION PROCESS

(71) Applicant: Apple Inc., Cupertino, CA (US)

(72) Inventors: Yannick L. Sierra, San Francisco, CA (US); Mitchell D. Adler, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/273,622

(22) Filed: Sep. 22, 2016

(65) Prior Publication Data

US 2017/0012974 A1    Jan. 12, 2017

Related U.S. Application Data

(63) Continuation-in-part of application No. 14/871,782, filed on Sep. 30, 2015.

(60) Provisional application No. 62/348,876, filed on Jun. 11, 2016, provisional application No. 62/189,178, filed on Jul. 6, 2015.

(51) Int. Cl.
*H04L 9/30* (2006.01)
*H04L 9/32* (2006.01)
*H04L 9/08* (2006.01)
*H04L 9/14* (2006.01)
*H04L 29/06* (2006.01)
*H04W 12/08* (2009.01)

(52) U.S. Cl.
CPC .............. *H04L 9/30* (2013.01); *H04L 9/0863* (2013.01); *H04L 9/14* (2013.01); *H04L 9/3247* (2013.01); *H04L 63/0884* (2013.01); *H04L 63/0892* (2013.01); *H04L 63/104* (2013.01); *H04L 2209/80* (2013.01); *H04W 12/08* (2013.01)

(58) Field of Classification Search
CPC ....................................................... H04L 9/30
USPC .......................................................... 713/176
See application file for complete search history.

(56) References Cited

U.S. PATENT DOCUMENTS

| | | |
|---|---|---|
| 6,732,144 B1 | 5/2004 | Muranaga et al. |
| 8,458,462 B1 | 6/2013 | Hanna |
| 8,989,706 B2 | 3/2015 | Ananthanarayanan et al. |
| 9,052,861 B1 | 6/2015 | Pizot et al. |
| 9,077,759 B2 | 7/2015 | Brouwer et al. |
| 9,203,824 B1 | 12/2015 | Nunn et al. |
| 2004/0131187 A1 | 7/2004 | Takao et al. |
| 2007/0033392 A1 | 2/2007 | Ganesan et al. |

(Continued)

*Primary Examiner* — Dant B Shaifer Harriman
(74) *Attorney, Agent, or Firm* — Morgan, Lewis & Bockius LLP

(57) ABSTRACT

Some embodiments provide a method for a first device to join a group of related devices. The method receives input of a password for an account with a centralized entity and a code generated by a second device in the group. When the second device determines that the code input on the first device matches the generated code, the method receives an authentication code from the second device for authorizing the first device with the entity as a valid device for the account. The method uses the password and information regarding the first device to generate an application to the group. After sending the application to the second device, the method receives information from the second device that enables the first device to add itself to the group. The second device verifies the generated application, and the method uses the information received from the second device to join the group.

21 Claims, 19 Drawing Sheets

(56) References Cited

U.S. PATENT DOCUMENTS

| | | |
|---|---|---|
| 2007/0063055 A1 | 3/2007 | Graf et al. |
| 2007/0271234 A1 | 11/2007 | Ravikiran |
| 2008/0189293 A1 | 8/2008 | Strandel et al. |
| 2009/0055464 A1 | 2/2009 | Multer et al. |
| 2009/0158041 A1 | 6/2009 | Kang et al. |
| 2009/0228977 A1 | 9/2009 | Lee et al. |
| 2011/0072274 A1 | 3/2011 | Leoutsarakos et al. |
| 2011/0252243 A1 | 10/2011 | Brouwer et al. |
| 2011/0302646 A1 | 12/2011 | Ronda et al. |
| 2012/0202428 A1 | 8/2012 | Mirbaha et al. |
| 2013/0226799 A1 | 8/2013 | Raj |
| 2014/0089671 A1 | 3/2014 | Logue et al. |
| 2014/0273854 A1 | 9/2014 | Breckman et al. |
| 2014/0281540 A1 | 9/2014 | Brouwer et al. |
| 2014/0289833 A1 | 9/2014 | Briceno et al. |
| 2014/0379783 A1 | 12/2014 | Tadayon et al. |
| 2015/0026125 A1 | 1/2015 | Sharma |
| 2015/0222615 A1 | 8/2015 | Allain et al. |

COMBINED AUTHORIZATION PROCESS

BACKGROUND

A user that owns multiple devices with overlapping functionality is becoming increasingly common. Smartphones, tablets, and computers all access the web, allow a user to process photos, etc., and users tend to have several such devices. Thus, a user wanting to share data between their devices and have access to data on multiple devices is increasingly common as well. Users may commonly use all sorts of different techniques to transfer data between devices, such as flash memory sticks, e-mail, etc. More efficient techniques for automatically sharing data between a user's devices are desired.

BRIEF SUMMARY

Some embodiments provide a method for enabling a first device to both (i) join a group of related devices in order to synchronize data with the devices and (ii) authorize itself as a valid device for an account with a centralized entity using a single process that only requires a single set of user inputs on the first device and one of the other devices already established in the group of related devices. In some embodiments, the devices in the group of related devices synchronize encrypted user data with each other in such a way that the centralized authority cannot decrypt the user data, even when the user data is synchronized through the centralized authority. Separately, the devices in the group of related devices are logged into an account with the centralized authority, such as a cloud services account, thus providing the devices unified access to the centralized authority. Different embodiments provide different techniques for accomplishing these two goals, with different inputs being entered on different devices.

In some embodiments, the first device (a "requesting device") receives two user inputs in order to perform the combined authorization and synchronization group joining process. The requesting device receives (i) input of a password for the account with the centralized entity and (ii) input of a code generated by a second device already established in the group of related devices, and authorized by the centralized entity (an "accepting device"). This code is generated in a random manner not reproducible by the centralized entity, and thus the centralized entity (through which some embodiments pass messages between the requesting device and accepting device) cannot use the code to illicitly gain access to the synchronization group (i.e., if the centralized entity is taken over and acts maliciously).

The code is generated on the accepting device and input by the user on the requesting device, and proof of the code is sent by the requesting device back to the accepting device, thereby proving to the accepting device that the user is in possession of both devices. Along with this proof, the requesting device also sends to the accepting device its public identity used for the synchronization group, encrypted with a shared cryptographic key (generated, at least in part, based on the password, as well as other inputs that make the key not derivable by the centralized entity). The accepting device decrypts the public identity of the requesting device, and prepares to receive an application to join the synchronization group from the requesting device that uses the same public identity. When this application is received, the accepting device (upon which the account password has previously been entered, e.g. as a precursor to the combined authorization process) automatically allows the requesting device to join the synchronization group without any further user input (e.g., user approval) required, as this user approval was previously taken care of by the user carrying the code generated by the accepting device to the requesting device.

In addition, the accepting device generates a second code in some embodiments, and sends this to the requesting device (e.g., in encrypted form) after receiving the proof of the first code from the requesting device. This second code is also a random or pseudo-random code, but is generated in such a way that the code (or proof of the code) is reproducible by the centralized entity (e.g., by tying the code in a deterministic manner to a property of the device known to the centralized entity). This second code is used, along with the account password, to authorize the requesting device with the centralized entity. In some embodiments, the centralized entity requires both the password and an additional authentication factor that proves that the user (who set up the account with the centralized entity) is in possession of the requesting device. This second code generated by the accepting device serves as such a second factor.

In some embodiments, rather than the combined synchronization group joining and centralized entity authentication process, the user can carry the second code from the accepting device to the requesting device, and use the code only as a second factor for authentication with the centralized entity. In order for the accepting device to determine whether this code is the first type of code (not reproducible by the centralized entity, used for the combined process) or the second type of code (reproducible by the centralized entity, used only for the authentication process), some embodiments use a marker in the code (e.g., one of the digits) that specifies which type of code it is.

In the above-described combined authorization process, the user account password still needs to be input (or cached, which is not optimal from a security perspective) on the accepting device, thereby requiring a level of user input on both devices. Other embodiments, however, only require that the account password and code be input on one of the devices (the code being generated by the other device). In order to accomplish this without requiring input of the password on the other device, additional operations are performed to have the requesting device join the synchronization group. Because the code generated by one of the devices and input on the other device is used to create a secure channel between the two devices, the devices can effectively send the account password (and/or other data required for the requesting device to join the synchronization group) across this channel in a trusted manner.

The processes are slightly different when the input is received on the requesting device as compared to when the input is received on the accepting device, although the basics of the processes are the same. To have the requesting device join the synchronization group and be authorized with the centralized entity, the user initially inputs the account password on the requesting device. Based on user acceptance (e.g., of a prompt) or user request on the accepting device, the accepting device displays a code (i.e., the code described above which is not reproducible by the centralized entity or another device) which the user carries to the requesting device and inputs on that device. As in the above process, the proof of the code is sent to the accepting device, and the code is used to create a secure channel between the devices. Through this secure channel, the authorization code can be sent to the requesting device, allowing the requesting device to authorize itself with the centralized entity.

To join the synchronization group, some embodiments normally require the requesting device to sign its public identity with its private key and with a private key for the user account (generated based on the account password) in order to apply to the group, and for the accepting device to validate this application and send out a new group definition. The group definition of some embodiments includes a list of all of the devices in the group and a generation count for the group, signed with (i) a private key of the accepting device and (ii) the private key for the user account. When the password (and code) have been entered on only the requesting device, the requesting device has the necessary information to prepare its application, but the accepting device cannot sign the group identifier that adds the requesting device to the synchronization group (because even devices authorized with the centralized entity do not store the account password in some embodiments, for security purposes). Thus, using the secure channel generated based on the input code, the accepting device sends the group identifier signed only with its private key (and not with the account key). This enables the requesting device to add the account key signature to the group identifier and send this out to the devices in the group, effectively adding itself to the group by using the signature of the accepting device.

Different but corresponding issues are encountered when the password and code are input on the accepting device (and not on the requesting device). In this case, the user initially enters the account password on the accepting device (and indicates in some manner that the requesting device should join the group and be authorized with the centralized account). The requesting device thus generates and displays the non-reproducible code, which the user carries to and inputs on the accepting device. As in the above-described embodiments, the input code is used to create a secure channel over which the accepting device sends the authorization code, allowing the requesting device to be authorized with the centralized entity.

To add the requesting device to the synchronization group, in this case the accepting device has the user account password while the requesting device does not. As such, the requesting device cannot sign the application with the private key for the user account. Instead, the requesting device sends its public identity over the secure channel to the accepting device. The accepting device signs the requesting device identity with the user account private key, then sends this partially completed application back to the requesting device. The requesting device completes the application by signing it with its own private key, and sends the complete application to the accepting device (again over the secure channel). At this point, the accepting device can add the requesting device to the synchronization group by assembling a complete group identifier and sending this to either the requesting device via the secure channel or to all of the devices in the synchronization group.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 5 conceptually illustrates a process of some embodiments performed by an accepting device to allow a requesting device to join a synchronization group of which the accepting device is a part and enable the requesting device to log into a central services account to which the accepting device is already logged in.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for enabling a first device to both (i) join a group of related devices in order to synchronize data with the devices and (ii) authorize itself as a valid device for an account with a centralized entity using a single process that only requires a single set of user inputs on the first device and one of the other devices already established in the group of related devices. In some embodiments, the devices in the group of related devices synchronize encrypted user data with each other in such a way that the centralized authority cannot decrypt the user data, even when the user data is synchronized through the centralized authority. Separately, the devices in the group of related devices are logged into an account with the centralized authority, such as a cloud services account, thus providing the devices unified access to the centralized authority.

Figure 1:
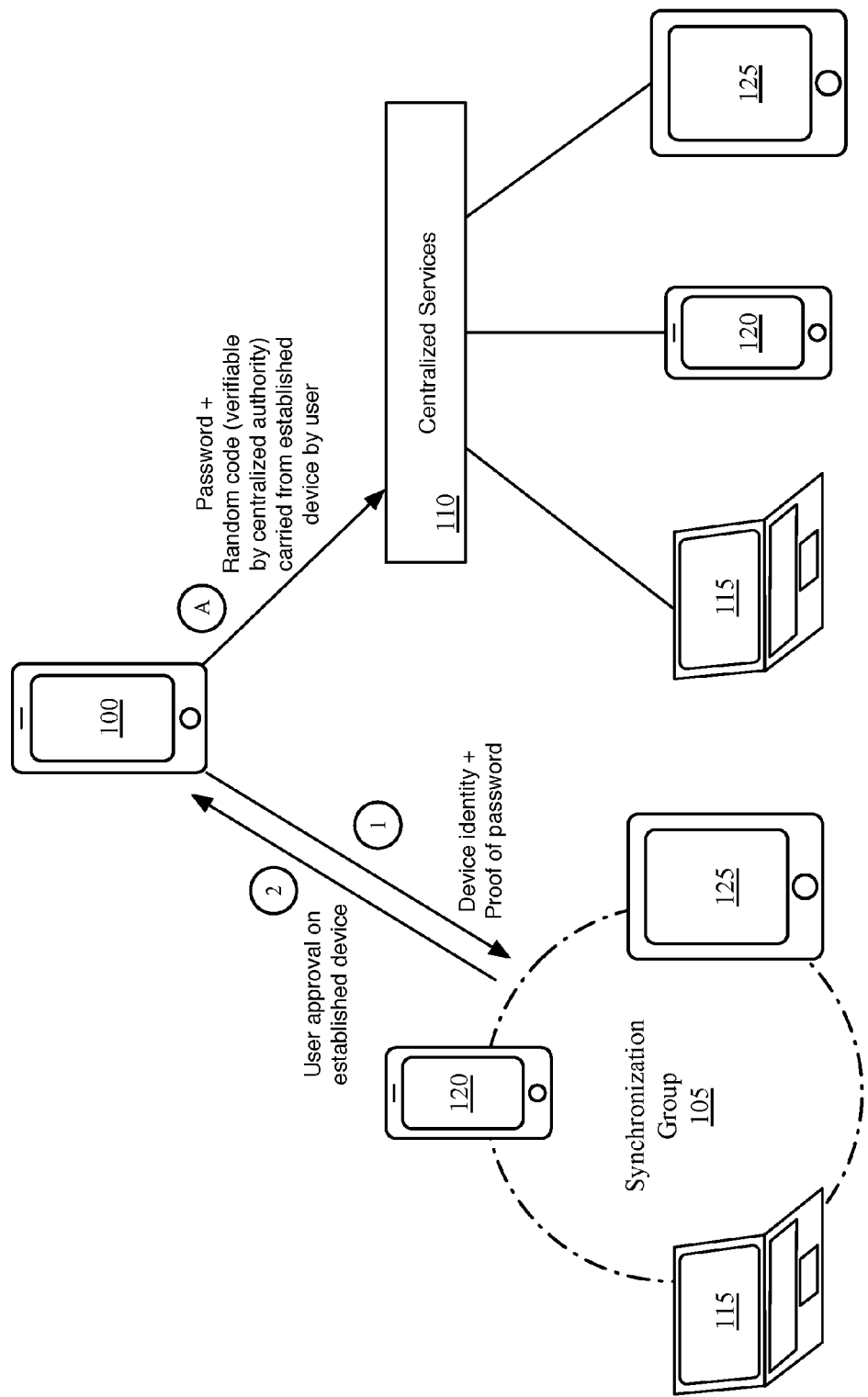
FIG. 1 conceptually illustrates a device separately joining both a synchronization group with three related devices as well as a centralized services (e.g., cloud services) account to which the three related devices belong.

FIG. 1 conceptually illustrates such a device 100 joining both a synchronization group 105 with three related devices 115-125 as well as a centralized services (e.g., cloud services) account to which the three related devices 115-125 belong. This enables the device 100 to synchronize protected user data (e.g., passwords, cryptographic keys, etc.) with the three devices 115-125, as well as log into a user account with the centralized services entity 110.

In this example, the devices 100 and 115-125 may be owned by a single user, and may be all sorts of different types of devices. For instance, this example shows the devices 100 and 120 are smart phones, the device 115 is a laptop computer, and the device 125 is a tablet. However, the devices could also be any other type of electronic device with which a user can log into a centralized user account, such as desktop computers, smart watches or other wearable devices, streaming video set top boxes, etc. In some cases, the user performs the process and/or processes to add the device 100 to the synchronization group and centralized services account when acquiring a new device, or if having reset an existing device.

In FIG. 1, the device 100 uses two separate processes to join the synchronization group 100 and the centralized services account, which require separate user interactions with the devices. First, as shown by the encircled "A", to be authenticated for the account with the centralized services entity 110, the user enters the account username and password on the device 100, which will also ask for a second authentication factor in order for the device to become trusted. In some embodiments, the centralized entity (e.g., a set of verification servers operated by the centralized entity) generates a random or pseudo-random code and sends this to the previously trusted devices 115-125, or either the server or the user commands one of the devices 115-125 to generate such a code. The user then enters this code on the requesting device 100 in order to verify that she is in possession of a valid, trusted device. Some embodiments require the trusted user device to have a device passcode, while other embodiments do not impose such a requirement.

Different embodiments may use different techniques to provide the code that the user is required to enter on the device 100. For instance, some embodiments use a numeric or alphanumeric code that is sent via a short message service (SMS) message (i.e., a text message) to the trusted device 115-125 of the user, which the user must then enter through a dialog box on the new device. Some embodiments use a phone call to one of the devices 115-125 to provide a similar alphanumeric code. Some embodiments use a Quick Response (QR) code, or similar visual code, and require the user to use the device 100 to photograph the visual code displayed on the trusted device 115-125. In some embodiments, the code is a random number generated based on a seed that is tied to the trusted device 115-125 (and only generated after a user requests the code, possibly requiring that the user also input a passcode of the device). This seed may be tied to a machine identifier, and is also known to the verification servers of the centralized entity. Irrespective of the type of code used, the requesting device 100 sends the code to the server (or proof of the code, such as a hash generated from the code). Only when the server has verified both the password and the code (functioning as a second factor for authentication) do the verification servers allow the new device to access the account.

As a separate process in FIG. 1, the device 100 joins the synchronization group 105. To join the synchronization group, the device 100 sends an application (shown by the encircled "1") to the other devices established in the synchronization group. This application requires the device to provide its identity for use in the synchronization group (e.g., a public key and possibly other data) as well as proof of its possession of the password to the centralized services account (e.g., by signing the application, which includes the device identity, with a cryptographic key derived from at least the password). In addition, in order for the device 100 to join the synchronization group, some embodiments require the user to indicate her approval on one of the established devices 115-125 that are already in the synchronization group. In some embodiments, one or more of the devices 115-125 displays a notification (after the device is unlocked by the user) that the requesting device 100 wishes to join the synchronization group, and requires that the user affirm that the requesting device should be allowed into the group 105. The joining of a synchronization group of some embodiments is explained in detail in U.S. Provisional Patent Applications 62/168,893, filed May 31, 2015, and 62/172,127, filed Jun. 6, 2015, as well as U.S. Patent Publication 2014/0281540 and U.S. patent application Ser. No. 14/872,013, filed Sep. 30, 2015. U.S. Provisional Patent Applications 62/168,893 and 62/172,127 as well as U.S. Patent Publication 2014/0281540 and U.S. patent application Ser. No. 14/872,013 are incorporated herein by reference.

The process of FIG. 1 requires the user to perform two separate sets of actions in order for the requesting device 100 to join the synchronization group 105 and access the centralized services account 110. First, the user needs to get a code from one of the devices 115-125 and enter that code on the device 100. Separately, the user needs to have the device 100 request to join the synchronization group, then go and approve that device on one of the established devices 115-125.

In some embodiments, however, the requesting device performs a combined authorization and synchronization group joining process, using only two user inputs. The requesting device receives (i) input of the account password and (ii) input of a code generated by a second device already established in the group of related devices, and authorized by the centralized entity (an "accepting device"). This code is generated in a random manner not reproducible by the centralized entity, and thus the centralized entity (through which some embodiments pass messages between the requesting device and accepting device) cannot use the code to illicitly gain access to the synchronization group (i.e., if the centralized entity is taken over and acts maliciously). In this description, that a code is not reproducible by the centralized entity means that the centralized entity does not have the seed data necessary to generate the code that will be displayed at any given time, and cannot brute force recover the code quickly or in a small number of attempts.

Figure 2:
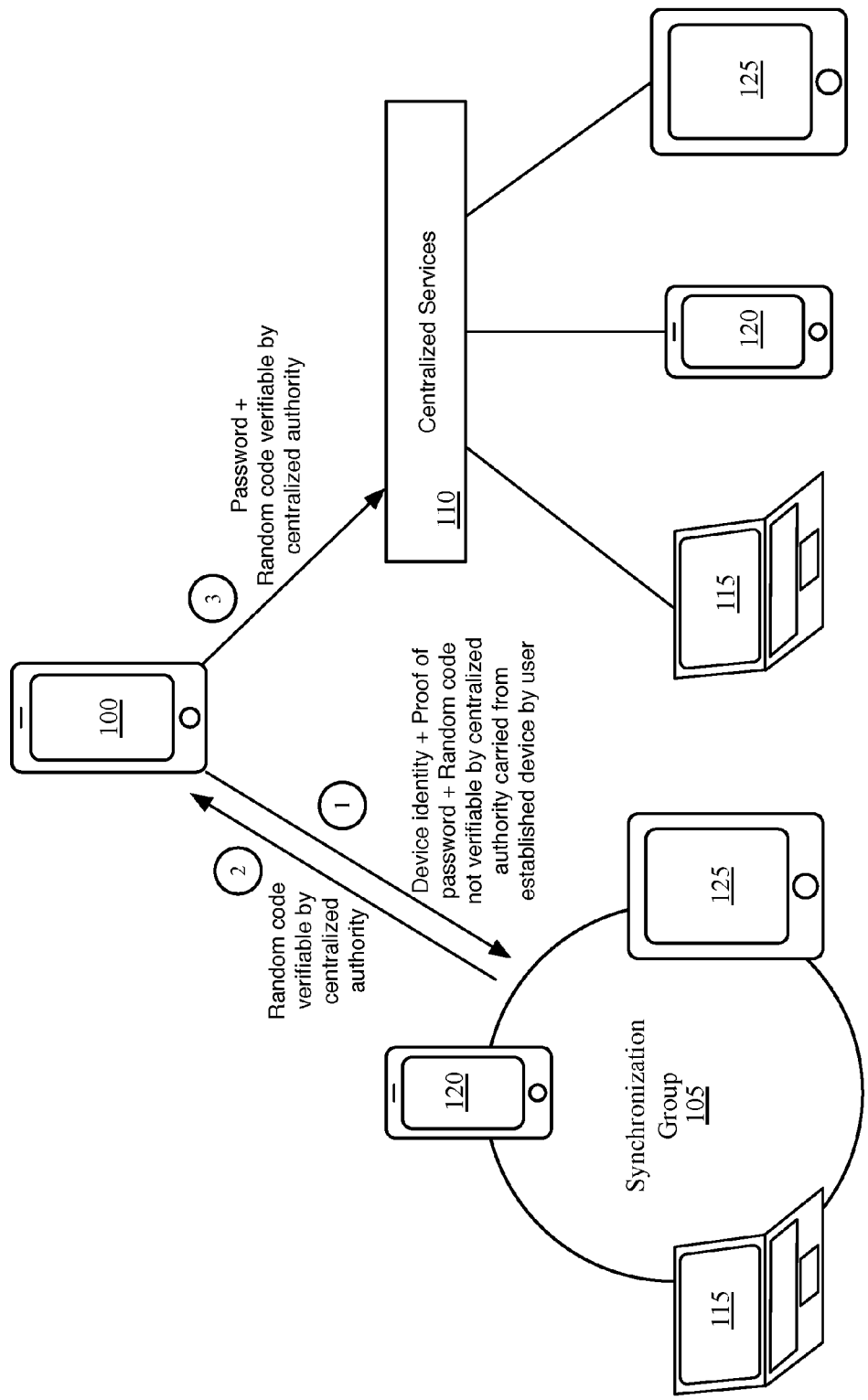
FIG. 2 conceptually illustrates a combined authorization and synchronization group joining process of some embodiments.

FIG. 2 conceptually illustrates such a combined authorization and synchronization group joining process of some embodiments. In this figure, the device 100 joins both the synchronization group 105 and the centralized services account 110, while requiring the user to only input the account password and a code generated and/or displayed on one of the established trusted devices 115-125. This combined process is performed in such a way that even if the centralized services authentication authority were to act maliciously, they would not be able to gain access to the synchronization group 105.

In this case, the user inputs on the requesting device 100 (i) the password of the cloud services account and (ii) a code generated on one of the established devices 115-125 that is not reproducible by the centralized services authentication servers. The code is generated on the established device 115-125 (acting as an accepting device) and input by the user on the requesting device 100, and proof of the code is sent by the requesting device back to the accepting device, thereby proving to the accepting device that the user is in possession of both devices. Along with this proof, the requesting device also sends to the accepting device its public identity used for the synchronization group, encrypted with a shared cryptographic key (generated, at least in part, based on the password, as well as other inputs that make the key not derivable by the centralized entity), as shown by the encircled "1". The accepting device decrypts the public identity of the requesting device 100, and prepares to receive an application to join the synchronization group from the requesting device that uses the same public identity. When this application is received, the accepting device (upon which the account password has previously been entered, e.g. as a precursor to the combined authorization process) automatically allows the requesting device 100 to join the synchronization group 105 without any further user input (e.g., user approval) required, as this user approval was previously taken care of by the user carrying the code generated by the accepting device to the requesting device.

In addition, the accepting device generates a second code in some embodiments, and sends this second code to the requesting device (e.g., in encrypted form) after receiving the proof of the first code from the requesting device, as shown by the encircled "2". This second code is also a random or pseudo-random code, but is generated in such a way that the code (or proof of the code) is reproducible by the centralized services entity (e.g., by tying the code in a deterministic manner to a property of the device known to the centralized entity). This second code is used, along with the account password, to authorize the requesting device with the centralized services entity, as shown by the encircled "3". In some embodiments, the centralized services entity requires both the password and an additional authentication factor that proves that the user (who set up the account with the centralized services entity) is in possession of the requesting device. This second code generated by the accepting device serves as such a second factor.

In some embodiments, rather than the combined synchronization group joining and centralized entity authentication process, the user can carry the second code from the accepting device to the requesting device, and use the code only as a second factor for authentication with the centralized services entity (i.e., as shown in FIG. 1, without joining the synchronization group). In order for the accepting device to determine whether this code is the first type of code (not reproducible by the centralized services entity, used for the combined process) or the second type of code (reproducible by the centralized services entity, used only for the authentication process), some embodiments use a marker in the code (e.g., one of the digits) that specifies whether the code is for use in the combined synchronization group joining and authorization process, or is for use as a second authentication factor only.

In the above-described combined authorization process, the user account password still needs to be input (or cached, which is not optimal from a security perspective) on the accepting device, thereby requiring a level of user input on both devices. Other embodiments, however, only require that the account password and code be input on one of the devices (the code being generated by the other device). In order to accomplish this without requiring input of the password on the other device, additional operations are performed to have the requesting device join the synchronization group. Because the code generated by one of the devices and input on the other device is used to create a secure channel between the two devices, the devices can effectively send the account password (and/or other data required for the requesting device to join the synchronization group) across this channel in a trusted manner.

The processes are slightly different when the input is received on the requesting device as compared to when the input is received on the accepting device, although the basics of the processes are the same. To have the requesting device join the synchronization group and be authorized with the centralized entity, the user initially inputs the account password on the requesting device. Based on user acceptance (e.g., of a prompt) or user request on the accepting device, the accepting device displays a code (i.e., the code described above which is not reproducible by the centralized entity or another device) which the user carries to the requesting device and inputs on that device. As in the above process, the proof of the code is sent to the accepting device, and the code is used to create a secure channel between the devices. Through this secure channel, the authorization code can be sent to the requesting device, allowing the requesting device to authorize itself with the centralized entity.

To join the synchronization group, some embodiments normally require the requesting device to sign its public identity with its private key and with a private key for the user account (generated based on the account password) in order to apply to the group, and for the accepting device to validate this application and send out a new group definition. The group definition of some embodiments includes a list of all of the devices in the group and a generation count for the group, signed with (i) a private key of the accepting device and (ii) the private key for the user account. When the password (and code) have been entered on only the requesting device, the requesting device has the necessary information to prepare its application, but the accepting device cannot sign the group identifier that adds the requesting device to the synchronization group (because even devices authorized with the centralized entity do not store the account password in some embodiments, for security purposes). Thus, using the secure channel generated based on the input code, the accepting device sends the group identifier signed only with its private key (and not with the account key). This enables the requesting device to add the account key signature to the group identifier and send this out to the devices in the group, effectively adding itself to the group by using the signature of the accepting device.

Different but corresponding issues are encountered when the password and code are input on the accepting device (and not on the requesting device). In this case, the user initially enters the account password on the accepting device (and indicates in some manner that the requesting device should join the group and be authorized with the centralized account). The requesting device thus generates and displays the non-reproducible code, which the user carries to and inputs on the accepting device. As in the above-described embodiments, the input code is used to create a secure channel over which the accepting device sends the authorization code, allowing the requesting device to be authorized with the centralized entity.

To add the requesting device to the synchronization group, in this case the accepting device has the user account password while the requesting device does not. As such, the requesting device cannot sign the application with the private key for the user account. Instead, the requesting device sends its public identity over the secure channel to the accepting device. The accepting device signs the requesting device identity with the user account private key, then sends this partially completed application back to the requesting device. The requesting device completes the application by signing it with its own private key, and sends the complete application to the accepting device (again over the secure channel). At this point, the accepting device can add the requesting device to the synchronization group by assembling a complete group identifier and sending this to either the requesting device via the secure channel or to all of the devices in the synchronization group.

The above describes examples of the device authentication system of some embodiments. Several more detailed examples are described below. Section I describes the combined authorization process of some embodiments. Next, Section II describes the determination as to whether an input code is for use in the combined process or only an account authentication process. Section III then describes the combined authorization process with input only being entered on one of the devices rather than both, while Section IV describes software architecture of a device that can act as either a requesting device or accepting device. Finally, Section V describes an electronic system with which some embodiments of the invention are implemented.

I. Combined Authorization Process

Figure 3:
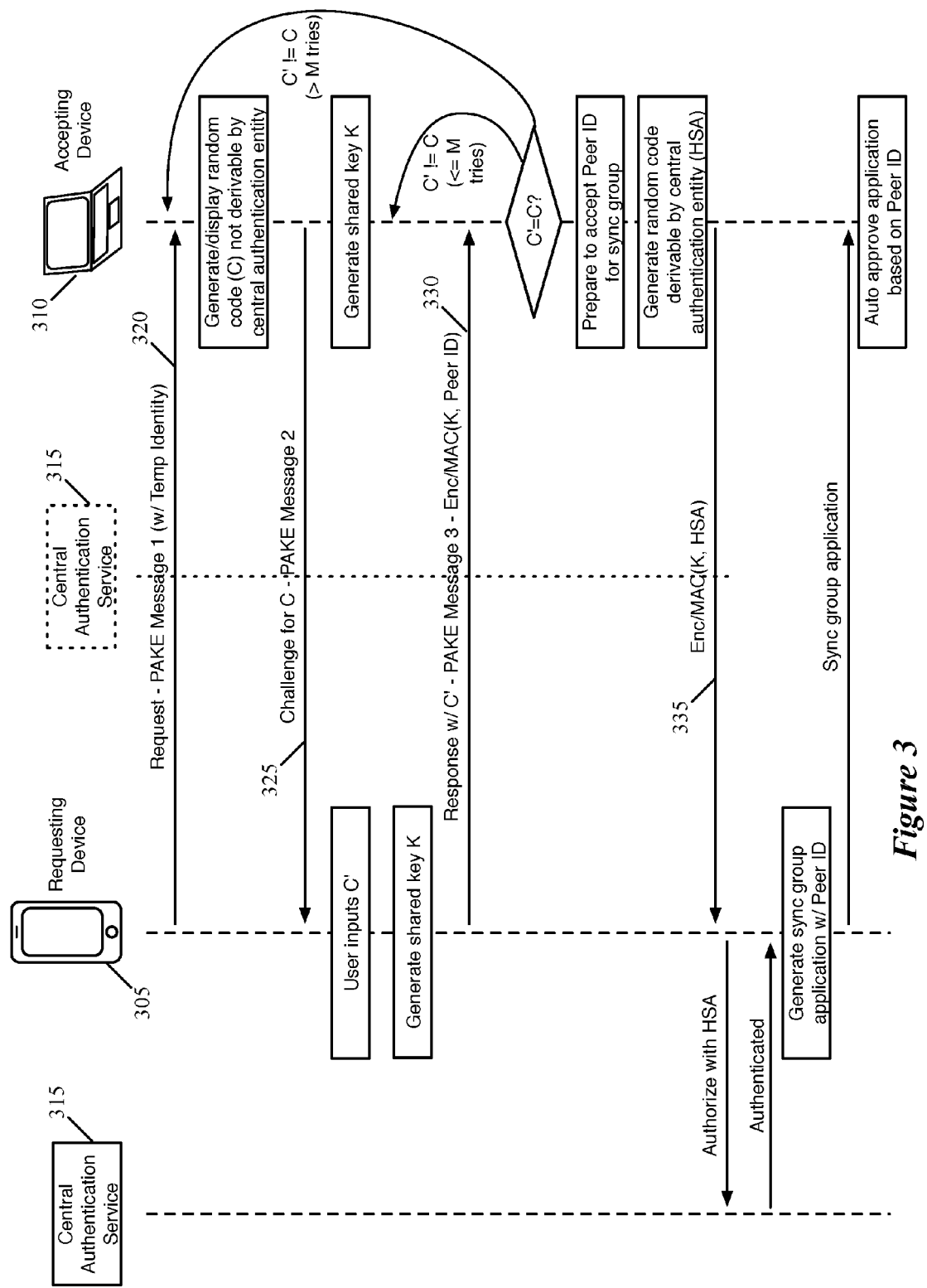
FIG. 3 illustrates the interactions between a first requesting device and a second accepting device, as a flow diagram showing the messaging between these two devices as well as with a central authentication server (or set of servers).

As mentioned, some embodiments provide a method for enabling a first device to both (i) join a group of related devices in order to synchronize data with the devices and (ii) authorize itself as a valid device for an account with a centralized entity using a single process user interaction process. This process requires only a single set of user inputs on the first device and one of the other devices already established in the group of related devices. FIG. 3 illustrates the interactions between a first requesting device 305 and a second accepting device 310, as a flow diagram showing the messaging between these two devices as well as with a central authentication server 315 (or set of servers).

The central authentication server 315 is representative of one or more servers that handle authentication for a centralized entity. In some embodiments, the entity provides cloud services (e.g., cloud storage, subscription services, etc.) and the devices register for the cloud services via the authentication servers 315. In addition, in some embodiments, these authentication servers serve as an intermediary between the requesting device 305 and the accepting device 310. That is, rather than passing messages directly to each other, the devices 305 and send messages through the authentication servers 315, with which they both communicate. The devices use an authenticated key exchange (AKE), as shown in FIG. 3, which prevents man-in-the-middle style attacks by the authentication service. In some embodiments, the devices use a specific type of authenticated key exchange referred to as a password-authenticated key exchange (PAKE). This description includes many references to a PAKE, but it should be understood by one of ordinary skill in the art that other embodiments could use other types of AKEs. In some embodiments, rather than communicating through the central servers, devices communicate directly with each other (e.g., via a short-range wireless protocol such as Bluetooth).

In the illustrated example, the accepting device 310 is already authenticated with the central authentication service 315 as a trusted device for a particular user account, and is part of a synchronization group with some or all of the devices authenticated with the central service for the user account. In addition, by the stage shown at the start of the flow diagram, the user would have entered the central authentication service password (or other credential) on the requesting device 305, and indicated (if necessary) for the requesting device to join the synchronization group. In some embodiments, when the user enters the authentication service account identifier (e.g., username, e-mail address, etc.) and password on a new device (e.g., a device that is brand new to the user, or which has been reset and is no longer setup for synchronization and/or access to the centralized services), the authentication service provides the device with the ability to contact the other devices belonging to the same account.

As shown, the requesting device 305 sends a first PAKE message 320. In some embodiments, although this flow diagram shows the messages between the requesting device 305 and a single accepting device 310, the requesting device actually sends this initial message to all of the devices that are part of the synchronization group. In some embodiments, the specific PAKE protocol used is the Secure Remote Password (SRP) protocol, which is an augmented PAKE protocol that creates a large private key shared between the two parties (the requesting and accepting devices 305 and 310).

In this first message 320 of some embodiments, the requesting device 305 (acting as the client in the PAKE) generates a first value $A = g\hat{\ }a \% N$, and sends this value A (a client public key value) to the accepting device 310. In this calculation, N and g are group parameters (N being a large safe prime with all arithmetic for the key exchange computed in the ring of integers module N, and g being a generator of the multiplicative group), while a is a random number (e.g., at least 128 or 256 bits in length). In addition, the requesting device 305 sends a temporary device identity in some embodiments. This is an identity used by the device only temporarily for the purpose of initiating the combined authorization and synchronization group joining process, and is different than the identity used later to actually join the group.

As mentioned, in some embodiments the requesting device 305 actually sends this message 320 to several devices (if several devices are registered for the user account with the authentication service 315). Upon a user unlocking the accepting device 310 (though shown in this case as a laptop, the accepting device could just as easily be another phone, a tablet, a desktop, etc.), the accepting device generates and displays a random code (C), which is not derivable by the central authentication entity (i.e., without using brute force tactics to which the process is designed to be resistant). This code is generated in a random or pseudo-random manner based on a secure seed in the accepting device 310, and is not tied in any way to a property of the device 310 known to the central service.

The code is then used as an input to create the second PAKE message 325 sent to the requesting device 305. In some embodiments, as the accepting device 310 acts as the "server" with respect to the PAKE, the accepting device generates a server public key B, first calculating a verifier value $v=g^x$ % N, with $x=Hash(s|Hash(I":"|C))$. Some embodiments use an SHA hash (e.g., SHA256, SHA1, etc.) for the hash function, with s being a random salt, I being the cloud services username, and C being the generated code. Next, the accepting device 310 uses the verifier value v to calculate the server public key $B=k*v+g^b$ % N, with b as a random number (e.g., of the same length as a) and $k=HASH(N|Pad(g))$ (the Pad( ) function of some embodiments converts an integer to a byte string, and left-pads the byte string with 0s as necessary). Some embodiments then send this value B as the second PAKE message 325. This second message 325 serves as a challenge for the code C, the input of which on the requesting device is central to the joint process.

Typically, unless the user unlocks multiple possible accepting devices to get codes from each of them, the requesting device 305 will only receive a challenge message 325 from one accepting device 310. At this point, the user enters the code C' (if entered correctly, C'=C). Different embodiments may use different techniques to provide this code C that the user is required to enter on the new device. For instance, some embodiments simply display an alphanumeric (or just numeric) code, which the user types on the requesting device. Other embodiments use a Quick Response (QR) code, or similar visual code, and require the user to use the new device to photograph the visual code displayed on the trusted device. Still other embodiments use audio, a set of device movement commands (which only work in the cases that the new device has an accelerometer and/or gyroscope that can detect movements accurately), or other codes that can (i) be replicated on the requesting device and (ii) can be translated into a number useable for the PAKE cryptographic calculations.

At this point, both the requesting and accepting devices 305 and 310 have the information necessary to generate a shared key K, also called a session key. Different embodiments may use different techniques to generate this shared key. In some embodiments, the session key is derived using a key derivation function, such as the HMAC-based Extract-and-Expand Key Derivation Function (HKDF). This HKDF, in some embodiments, provides the same session key on both the requesting and accepting devices 305. In some embodiments, the session key K is based on the transmitted public key values A and B, as well as the values I, P, N, g, and most importantly the code C. Thus, if the code C' is entered incorrectly on the requesting device 305, the shared key will not match and the operations will fail.

The requesting device, using the shared key K and the input code C', sends a PAKE message 330 to verify that the code was entered correctly. In some embodiments, this message 330 includes (i) an answer to the challenge for the input code sent in the second message 325 and (ii) the peer identity of the requesting device 305 encrypted with the shared key K. In some embodiments, the answer to the challenge is a proof of possession of the input code C', such as a value derived from the input code C' (e.g., a hash value generated from the input code). Using a hash value or other value generated from a one-way function prevents a man in the middle attack in which the centralized entity intercepts the code and uses the code to introduce an unauthorized device as a requesting device.

The peer identity of the requesting device 305, in some embodiments, includes a device public key used to identify the device. The peer identity may also include other identifying information, such as a name of the device, a device authentication code derived cryptographically from device hardware information, etc. Some embodiments encrypt this peer identity with a symmetric key encryption function, such as AES, using the shared key K as the encryption key. Other embodiments use unidirectional keys for each of the two directions, which are derived from K (i.e., a first key K_1 for messages sent from the requesting device 305 to the accepting device 310, and a second key K_2 for messages sent in the opposite direction).

Upon receiving the response message 330, the accepting device 310 determines whether the input code C' matches the generated code C. When the requesting device 305 sends data generated based on input code C' (e.g., a hash value), the accepting device 310 performs the same computations to generate data based on the generated code C. If these values match, then the accepting device concludes that the user is in possession of both devices and has entered the code correctly.

However, if the input code does not match the generated code, then the user will have to input the code again. In some embodiments, the accepting device only allows a threshold number of attempts at a particular code, to prevent any sort of brute force guessing of the code. Thus, the accepting device performs different actions next depending on the number of failed attempts at a particular code that it generated. As shown, if the number of attempts is less than the threshold M, then the accepting device 310 awaits another attempt at the code, in which case the user enters a new code C' on the requesting device 305, in hopes that this time C'=C. However, if the threshold number of attempts have been made at the first code, then the device generates and displays a new random code (again, not derivable by the central authentication entity), and resends a new message 305. In addition, in some embodiments, the accepting device 310 sends an error message to the requesting device 305 (not shown) each time a message 330 is received from the requesting device with an incorrect code attempt. This error message causes the requesting device 305 to return to its state after receiving the second message 325. Other embodiments, however, only send such an error message when the accepting device re-generates a new code.

Once the code has been correctly input on the requesting device 305 and verified by the accepting device 310, the accepting device also decrypts the peer identity sent with the message (e.g., using the same shared key K or portion K_1 of the shared key as was used to encrypt the peer identity, in the case of symmetric encryption). The accepting device 305 also generates a new random code (HSA) derivable by the central authentication entity. This random code, referred to as a second factor authentication code, is generated based on a seed data known to the central authentication service 315, and thus differs from the random code C. The seed data is specific to the device, and in some embodiments the code HSA generated from the seed data varies randomly over time in a deterministic manner reproducible by the central authentication entity. The accepting device sends a message 335 with this new code HSA encrypted using the session key K (or the portion K_2 used for sending messages in this direction). In some embodiments, this code is encrypted in the same manner as the peer identity (e.g., using a symmetric encryption function such as AES).

Because the code HSA is reproducible by the central authentication service 315, the requesting device can use this code to authenticate itself with this service, using the code as a second authentication factor (in addition to the password entered at the start of the process) to prove that the user of the accepting device 310 is also the user of the requesting device 305. In some embodiments, when not using the combined authentication and synchronization group joining process, the accepting device displays the code HSA (rather than the code C), and the user enters this code on the requesting device in order to complete the two-factor authentication with the central authentication service. As described in greater detail below, some embodiments use a flag in the entered code so that the requesting device knows whether the entered code should be sent to the authentication service or to an accepting device (as in message 330).

As shown, having received the code HSA from the accepting device 310, the requesting device decrypts this code (using either the shared key K or the portion K_2 used for transmission from the accepting device to the requesting device) and uses the code to authenticate itself with the central authentication service 315. In some embodiments, this grants the device 305 access to the user's cloud services account. The device uses the cloud services account name and password to identify the account and provide an initial authentication factor, then uses the HSA code as a second authentication factor to prove that the user of the requesting device 305 is in possession of at least one trusted device associated with the account. The authorization attempt message 340 sent to the authentication service 315 and the authentication verification message 345 received in reply may be single messages or representative of several messages sent back and forth between the requesting device and the authentication service in different embodiments.

After having been authorized with the central authentication service 315 to access the user account with the central entity, the requesting device 305 generates an application to join the synchronization group, using the peer identity sent to the accepting device 310 as part of the message 330. In some embodiments, the application is signed with two private keys, for which the accepting device has the public key (and can therefore verify the signatures). These private keys include a user key and a device key. The user key, in some embodiments, is generated (at least in part) based on the central authentication service password, which is known to the accepting device 310. The device key is generated based on random seed data specific to the requesting device 305, and the public key used to verify the signature is also part of the peer identity in some embodiments (so that the accepting device already has this public key and can therefore verify the signature). The accepting device 310 is already prepared to automatically approve this application so long as the signatures are correct and the peer identity matches that which was previously received during the PAKE messages, and thus approves the application of the requesting device without any additional user input (i.e., the user approval of the requesting device is handled by the input of the code C on the requesting device earlier). The synchronization group joining application process of some embodiments is described in more detail in U.S. Provisional Patent Applications 62/168,893 and 62/172,127, as well as U.S. Patent Publication 2014/0281540 and U.S. patent application Ser. No. 14/872,013, all of which are incorporated by reference above.

A. Requesting Device Process

Figure 4:
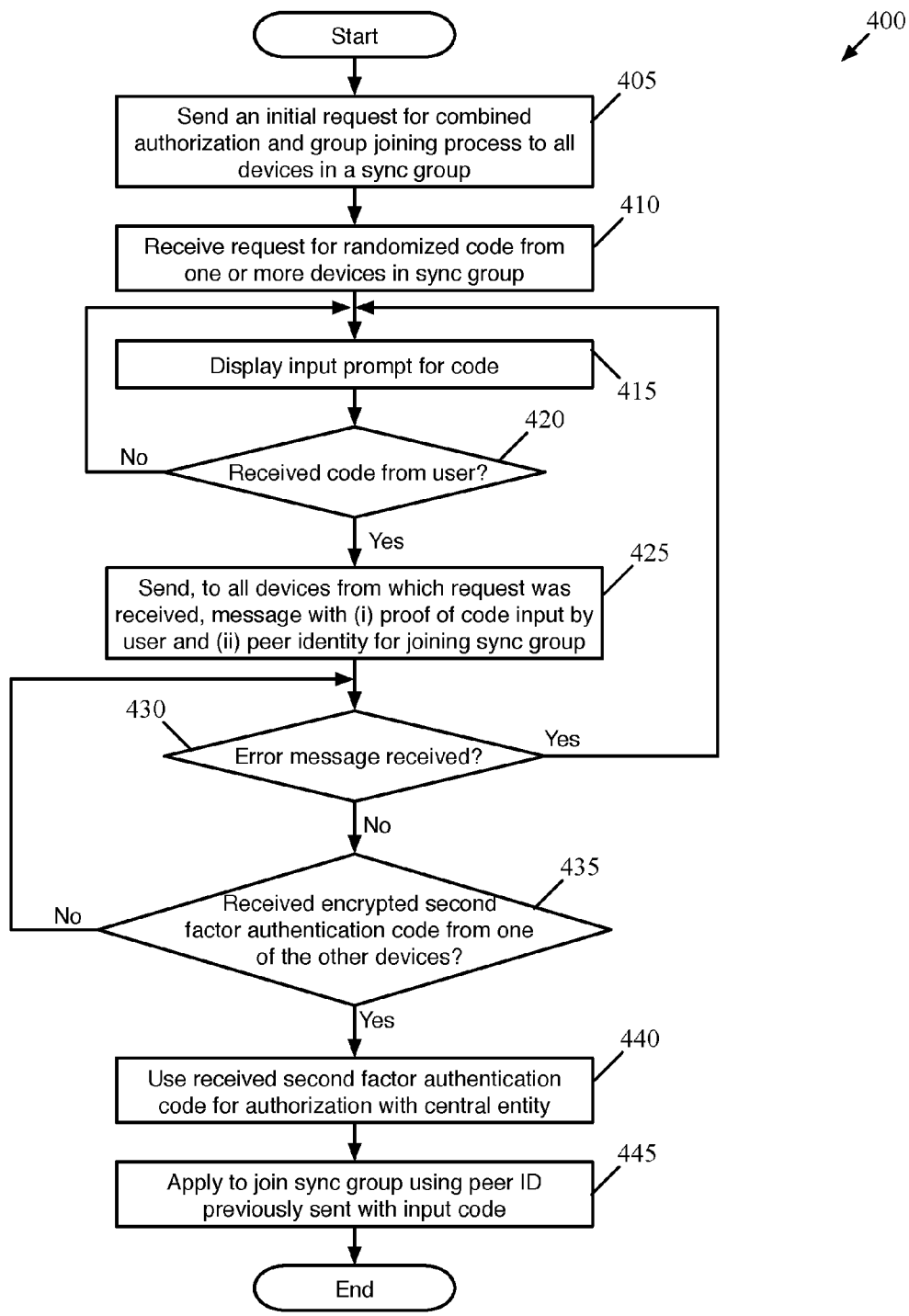
FIG. 4 conceptually illustrates a process of some embodiments performed by the requesting device to both join a synchronization group and be authorized for an account with a central service entity.

FIG. 4 conceptually illustrates a process 400 of some embodiments performed by the requesting device (e.g., the device 305) to both join a synchronization group and be authorized for an account with a central service entity. In some embodiments, the process 400 is performed at the time of device setup—e.g., when a user acquires a new device, resets to original settings on an existing device, etc. In other embodiments, the process 400 begins at the behest of a user after the device has been set up (for instance, if the user did not want to have the device join the synchronization group and log into the centralized entity at the time of device setup).

As shown, the process 400 begins by sending (at 405) an initial request to start the combined authorization and synchronization group joining process to all of the devices in the sync group. In some embodiments, by this time the user would have entered the username and password for the central service entity (e.g., a cloud services entity) on the requesting device. This grants the device access to learn the identities of the other devices associated with the username by the central service entity in some embodiments, allowing the requesting device to send the initial request message to each of these devices. In other embodiments, the device sends the message to the authentication service of the central service entity, which distributes the message to the other devices. As described above, in some embodiments the device calculates a first value A=g^a % N, and sends this value A (a client public key value) to the other devices in the synchronization group. In addition, the requesting device sends a temporary device identity along with the initial request message in some embodiments. This is an identity used by the device only temporarily for the purpose of initiating the combined authorization and synchronization group joining process, and is different than the identity used later to actually join the group.

Next, the process receives (at 410) a request for a randomized code value from one or more devices in the synchronization group. In some embodiments, each of the devices to which the message was sent may send such a request (i.e., the request described above as the second message 325). However, the devices only send such a request if the user turns on and unlocks the device, prompting the device to display the randomized code and send the challenge message to the requesting device. Typically, the user will only go to one of her existing devices to generate the code, and thus only one request will be received. However, in some cases, multiple such request messages are received. As described above, in some embodiments the received request message includes a second ("server") public key value B, calculated as $B=k*v+g^b$ % N by the device from which the request message is received.

The process 400 also displays (at 415) an input prompt for a code (e.g., a box into which the user can type the code, whether through a keyboard, touchscreen, or other input device), and waits for the user to provide a code attempt as input. Some embodiments display this input prompt irrespective of whether a request (second PAKE message) has been received, displaying the prompt as soon as the initial request has been sent at 405. The process determines (at 420) whether code has been input, and continues to display the prompt (at 415) until such input is received (or until the user cancels the operation, which is not shown in the flow chart). Though shown as a determination (at 420), one of ordinary skill will recognize that some embodiments do not make such a repeated determination operation, but instead enter a wait state until the user enters the code, which prompts subsequent operations of the device.

Upon receiving the code, the process sends (at 425), to all of the devices from which a request was received, a message that includes (i) a proof of the code input by the user (e.g., a value derived from this code) and (ii) a peer identity for joining the synchronization group. As described above by reference to FIG. 3, in some embodiments the peer identity is encrypted with a symmetric key derived in part from the code input by the user. In some embodiments, the user specifies on which device the input code was generated and displayed, and the message is only sent to that device at 425. However, in other embodiments, the process does not know from which device this message was received, and therefore sends the message at 425 to all of the devices to which the initial request was sent at 405.

The device then awaits to receive the next response from an established accepting device. As shown, the process determines (at 430) whether an error message was received. When the user inputs the code incorrectly into the requesting device and this device sends the incorrect code to the accepting device at 425, then the accepting device returns an error message in some embodiments. Upon receiving this error message, the process returns to 415 to display the prompt and receive another attempt to input the code. Though not shown, if the user inputs the wrong code at least a threshold number of times, the accepting device will generate a new random code, in order to thwart any brute force attempt at the code.

However, assuming no error message is received, the device also determines (at 435) whether a message with an encrypted second factor authentication code has been received from one of the other devices already established in the synchronization group (i.e., one of the devices to which the input code was sent at 425). This message is only received if the code is entered correctly at operation 420 and sent to the accepting device on which the code was generated. The second factor authentication code, in some embodiments, is similar to the code displayed by the accepting device and entered at 420, but is reproducible by the authentication servers. This second factor authentication code is generated based on a seed data known to the central authentication service, and thus differs from the random code entered by the user. The seed data is specific to the device, and in some embodiments the code generated from the seed data varies randomly over time in a deterministic manner reproducible by the central authentication entity.

If neither an error message nor a message with the second factor authentication code, the process 400 returns to 430 (i.e., continues to wait for a reply). One of ordinary skill will recognize that, again, this is a conceptual representation of the process performed by the requesting device. For instance, even if the requesting device receives multiple challenge requests, then it will send the input code to multiple possible accepting devices, and the code will be incorrect for at least one of these possible accepting devices. Some embodiments only return to 415 if error messages come from all of the devices to which the code was sent. In other embodiments, if an error message is received from a first device, the process 400 returns to 415, but cuts out to operation 440 if a message with a second factor authentication code is subsequently received.

Once the second factor authentication code is received, the process 400 uses (at 440) the received second factor authentication code to authorize itself with the central entity (e.g., the cloud services entity). The process, in some embodiments, uses the cloud services account name and password (input prior to the start of process 400) to identify the account and provide an initial authentication factor, then uses the newly received code as a second authentication factor to prove that the user of the requesting device is in possession of at least one trusted device associated with the account.

Next, having been authorized with the central authentication server, the process 400 applies (at 445) to join the synchronization group using the peer identity previously sent with the input code at 425. As described above by reference to FIG. 3, in some embodiments the process 400 signs this application with (i) a private user key based, at least in part, on the central services account password, and (ii) a private device key generated based on random seed data on the requesting device. Though not shown, assuming the signatures are correct and the peer identity matches that sent at 425, the accepting device automatically approves this application without user input, and notifies both the requesting device and the other devices in the synchronization group, so that the requesting device can receive shared synchronization data from the other devices.

B. Accepting Device Process

Figure 5:
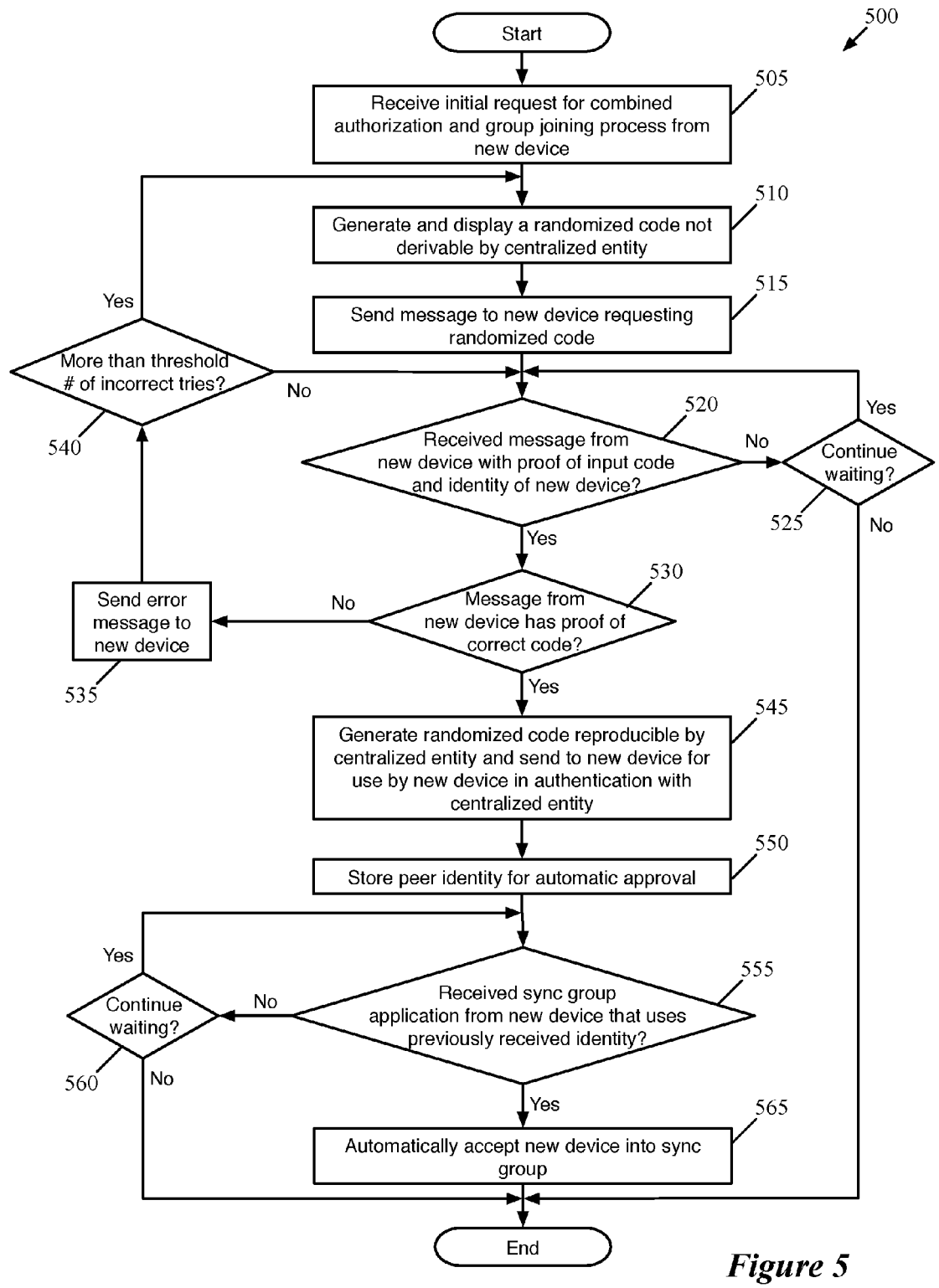

FIG. 5 conceptually illustrates a process 500 of some embodiments performed by an accepting device (e.g., the device 310) to allow a requesting device to join a synchronization group of which the accepting device is a part and enable the requesting device to log into a central services account to which the accepting device is already logged in. As shown, the process 500 begins by receiving (at 505) an initial request for a combined authorization and group joining process from a new device. As noted above, the new device may be a brand new device for the user, or the user may have reset the device operating system, such that the device is effectively new and must rejoin the synchronization group and central services account. The request message, in some embodiments, is the first message of a PAKE, and includes a client public key value A calculated as $A=g^a$ % N and described in greater detail above by reference to FIG. 3.

After receiving the request message from the new device, the process 500 generates and displays (at 510) a randomized code not derivable or reproducible by a centralized authentication entity. In some embodiments, the messages are sent through the centralized authentication servers (that authenticates the login credentials for the centralized entity), and thus (i) a PAKE is used to avoid man-in-the-middle attacks and (ii) a random code is generated in such a way as to preclude the centralized authentication entity from using the code, combined with knowledge of the user account name and password, to join the synchronization group and receive access to the user's secure data. In some embodiments, as a further security measure, the accepting device performing the process 500 requires the user to input a device passcode before displaying a random code at 510. This makes it more difficult for an unauthorized user to get a code used for joining a synchronization group and the central services account.

In addition to generating and displaying the randomized code, the process sends (at 515) a message to the new device requesting the randomized code (or requesting proof of the code). In some embodiments, this message includes a second ("server") public key value B for the PAKE, calculated as $B=k*v+g^b \% N$, as described above. This message prompts the requesting device to display an input dialog for the user to input the code displayed by the accepting device in some embodiments (in other embodiments, the requesting device displays the input dialog irrespective of whether the message is actually received from an accepting device), and send back either the input code itself or data derived from the code that can be used as proof of the input code to the accepting device.

After sending the challenge message to the requesting device, the process 500 awaits a message from the requesting device containing the code input on that device or a proof derived from the input code. Thus, the process determines (at 520) whether a message has been received from the new device with a proof of the input code (e.g., a value derived from the input code). If no such message has been received, the process determines (at 525) whether to continue waiting for such a message. If the process should not continue waiting, the process 500 ends. Otherwise, the process returns to 520 to continue awaiting a message from the new device. The process may end prematurely if, e.g., the user cancels the operation, powers off the accepting device performing the process 500, etc. In addition, one of ordinary skill in the art will recognize that this is a conceptual process, and that the process running on the accepting device would essentially enter a wait state until the message is received from the requesting device, causing the accepting device to proceed to operation 530.

When the process 500 does receive a message from the new requesting device, the process determines (at 530) whether the new device has received a correct proof of the code (i.e., the code displayed by the device at 510). As described above, in some embodiments the new device sends a value generated from the input code (e.g., a hash value generated from the code) rather than the code itself. In this case, in order to determine whether the input code on the new device is correct, the accepting device performs the same computation to generate the proof from the displayed random code, and determines whether this matches the received proof.

When the accepting device determines that the input code does not match the code that it generated, the process sends (at 535) an error message to the new device to indicate that the code was incorrect and that the user should re-enter the code on the device. The process 500 also determines (at 540) whether the code has been input incorrectly more than a threshold number of times. Some embodiments only allow the user to make a certain number of attempts (e.g., 2, 3, 5, 10, etc.) at inputting a particular generated code, so as to eliminate brute force guessing at the code. As such, if the accepting device has received more than the threshold number of messages indicating code input attempts, the process returns to 510 to generate and display a new random code, and send another challenge message to the new device with a new server public key B (computed using the new random code). If the number of attempts at the current code is less than the threshold amount, the process returns to 520 to await another message with an attempt at the current code.

On the other hand, if the message from the new device indicates that the user has input the code correctly on the new device, the process 500 proceeds based on the premise that the user has proven possession of both devices. Thus, the process 500 generates (at 545) a randomized code reproducible by the centralized entity, and sends this new randomized code to the new device for use in authenticating the new device with the centralized entity. As described above, in some embodiments the accepting device encrypts this randomized code with the shared session key K or a portion K_2 of the shared key used for messages from the accepting device to the requesting device, before sending the code.

The randomized code generated at 545 is also referred to as a second factor authentication code, because it is used, along with the username and password of the centralized services account (the first authentication factor), to authenticate the device with the centralized services entity. The second factor authentication code, in some embodiments, is similar to the code generated at 510, but is reproducible by the authentication servers. This second factor authentication code is generated based on a seed data known to the central authentication service, and thus differs from the first random code that is not derivable by the centralized entity. The seed data is specific to the device, and in some embodiments the code generated from the seed data varies randomly over time in a deterministic manner reproducible by the central authentication entity.

The process also decrypts and stores (at 550) the peer identity received at 520, which identifies the new requesting device, for automatic approval. This peer identity information is stored by the device (in some embodiments, for a limited period of time), so that when the new device applies to join the synchronization group, the accepting device can automatically allow the new device into the group without additional user input.

The process 500 then determines (at 555) whether it has received a synchronization group application from the new device that uses the previously received and stored peer identity. At this point, the new device would have used the second factor authentication code to log into the central services account, and then sends the application to the accepting device. In some cases, the receipt of the synchronization group joining application may come a substantial amount of time after the initial PAKE process (and is transmitted in a separate manner from the PAKE messages). When the application has not been received, the process determines (at 560) whether to continue waiting. For example, if a timeout period exists for auto-approval, and that timeout is reached, the process ends. Otherwise, the process continues to await receiving a synchronization group application at 555.

When the synchronization group application is received from the new device with the correct peer identity, the process automatically accepts (at 565) the new device into the synchronization group without any additional user input. The device does still ensure that the application is correctly signed (e.g., with the private user key generated from the account password and the private device key that corresponds to the public key that is part of the peer identity). The process then ends, having allowed the new device into the synchronization group.

C. User Interactions in Combined Process

Figure 6A:
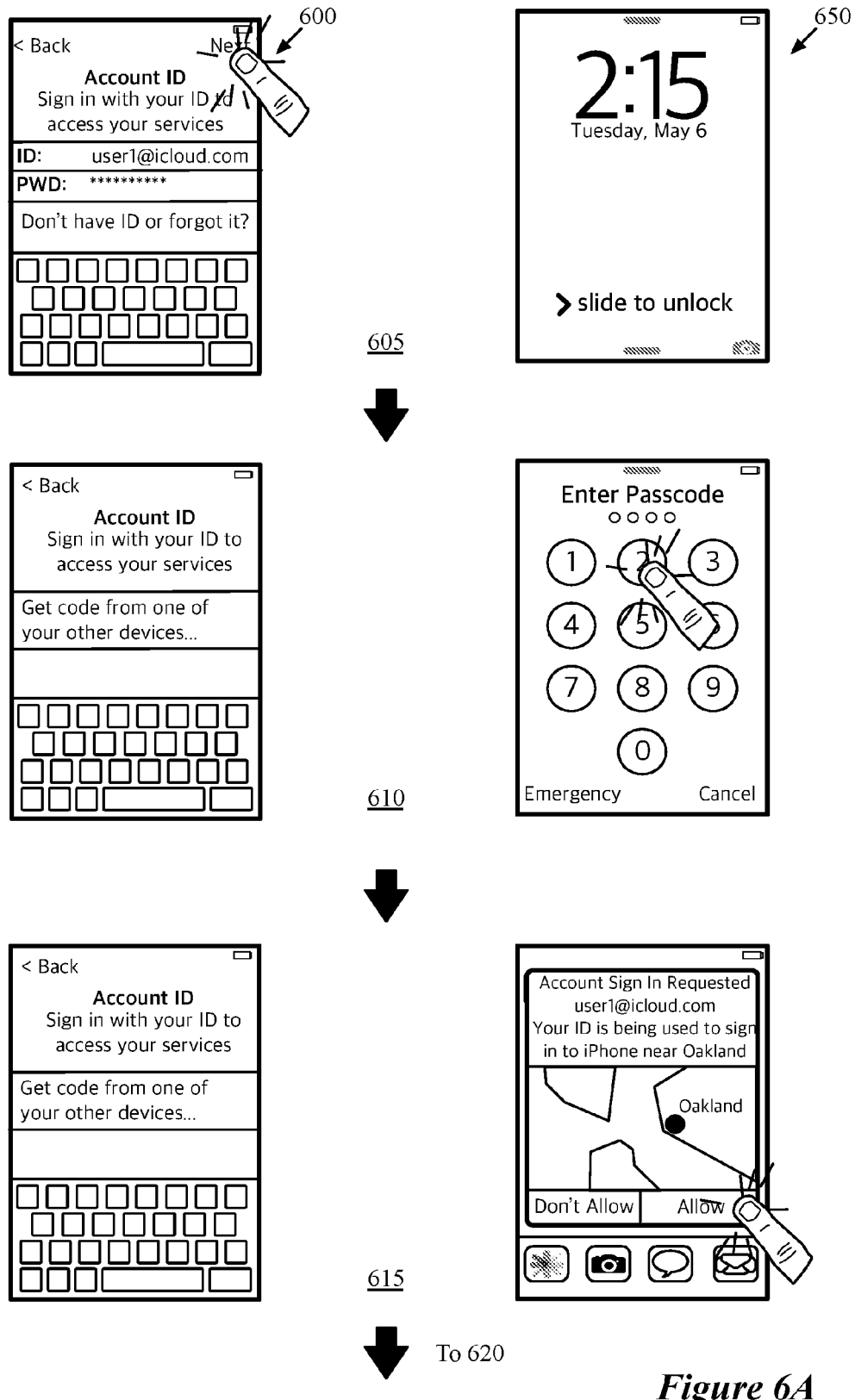
FIGS. 6A-B illustrate the user interfaces of a requesting device and an accepting device as the devices perform the combined synchronization group joining and account authorization process of some embodiments.
Figure 6B:
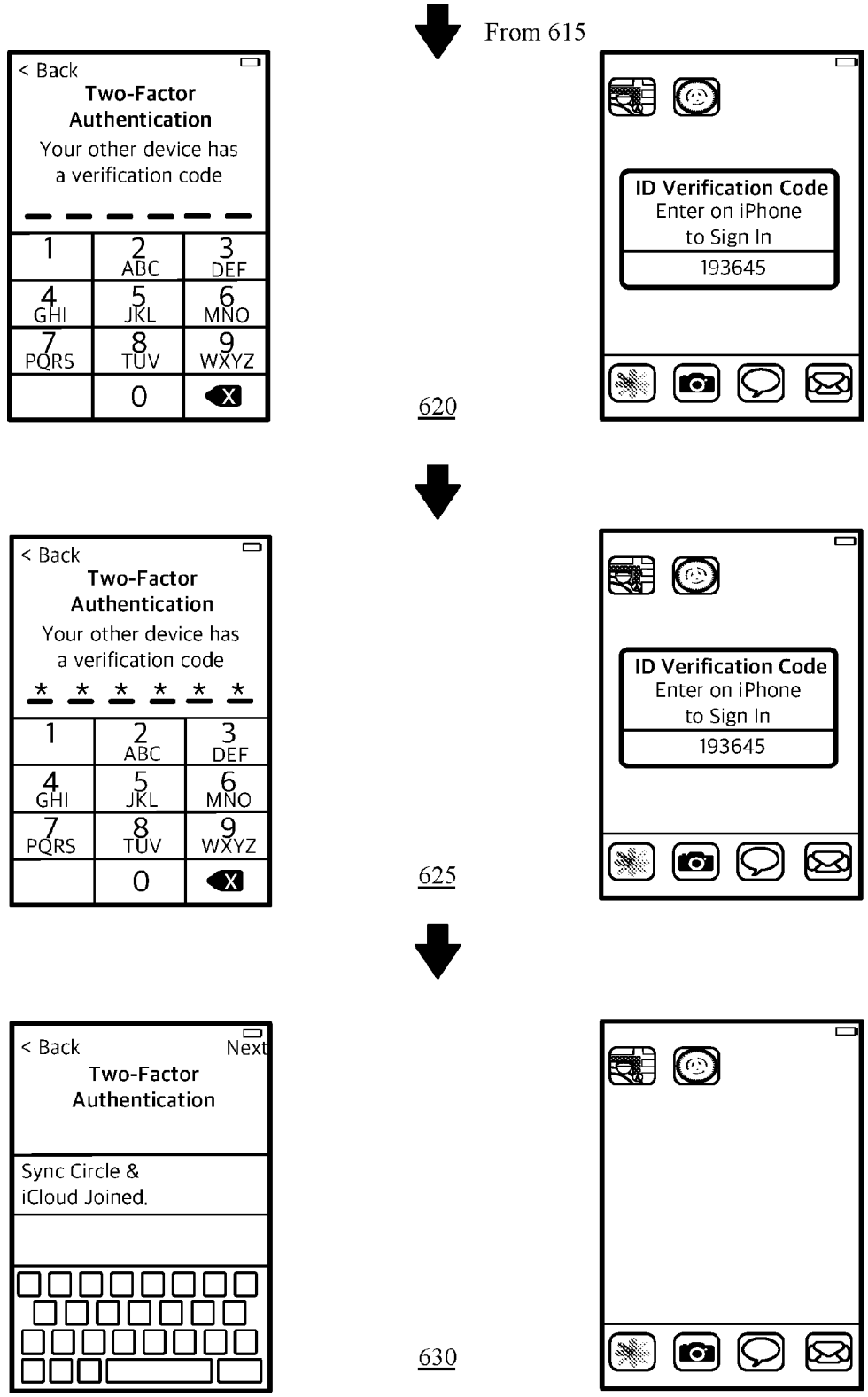

FIGS. 6A-B illustrate the user interfaces of a requesting device 600 and an accepting device 650 over six stages 605-630, as the devices perform the combined synchronization group joining and account authorization process of FIG. 3. In this example, the requesting device 600 is shown on the left side of each stage and the accepting device 650 is shown on the right side of each stage. In the illustrated case, both of the devices are the same type of device (smartphones); as shown above, the two devices may be different types of devices in some cases (e.g., one or both of the devices could be a tablet, smart watch, laptop, desktop, etc.).

As shown, at the first stage 605 the user is setting up the requesting device 600, entering the account username and password as part of the combined cloud services (e.g., iCloud) account and synchronization group (sync circle) joining process. One of ordinary skill will recognize that the user interfaces shown in this figure are merely examples, and that different embodiments may display the various features differently (e.g., inputting the username first and the password on a separate screen). In addition, many features unrelated to the present invention are left out of the UI for simplicity. Currently, the accepting device 650 is shown as locked, and the user is not yet interacting with the device.

After the user enters the password on the requesting device 600, the device verifies this password with the central servers and receives a list of devices for the account. The device 600 then sends the first PAKE message (e.g., message 320) to the second device (as well as to any additional devices associated with the cloud services account). The user then selects one of the other already trusted devices for the account to use as the accepting device, in this case the device 650. As shown in the second stage 610, the user unlocks the accepting device 650 in order to begin the acceptance process on the device. The requesting device 600 is in a wait state at this point.

In the third stage 615, the accepting device 650 has been unlocked, and prompts the user that a new device (New iPhone) wants to join the synchronization group. In some embodiments, the user is provided with options to either accept the new device (thereby allowing the combined process to continue) or cancel the process, preventing the new device from joining (e.g., if the user has not actually started the process on a new device and believes that this is a malicious attempt to join the synchronization group. In this case, the user selects the "okay" option to continue the process. In some embodiments, the accepting device 650 provides additional data about the device that is attempting to join. For instance, as shown here, in some embodiments the device displays a map that shows the location of the requesting device (in other embodiments, an affordance is provided enabling the user to request this map). This provides the user with additional information as to whether the request should be approved and a code generated. In some embodiments, this additional information is also provided for the separate account access and synchronization group joining flows, as shown in FIG. 1.

As such, the accepting device 650 displays a randomized code at the fourth stage 620. This randomized code is generated in such a way as to not be reproducible by the cloud services authentication servers, as the code will allow synchronization group joining in addition to access to the cloud services account. In addition to displaying the randomized code, the requesting device will have generated the second PAKE message and sent this to the requesting device 600. The requesting device 600 therefore displays a UI that allows the user to enter the authorization code. In other embodiments, the requesting device 600 displays this UI starting at stage 610 (i.e., as soon as it sends the first PAKE message), or a fixed amount of time after sending the first PAKE message.

In the next stage 625, the user enters the authorization code on the requesting device 600. In this case, the authorization code is a six digit numeric code ("193645"). However, different embodiments may use different lengths of code, may include alphanumeric codes (e.g., "19AZ6Q9"), or may use other types of codes (e.g., visual codes that the requesting device is required to capture using a camera, audio codes that the requesting device is required to capture using a microphone, etc.). The user enters the code on the requesting device 600 while the accepting device 650 awaits the next stage in the process. In some cases, a similar UI is provided for inputting the second factor authentication code when the requesting device is only logging into the centralized services account, in which case the displayed code will be generated by the server. However, if the requesting device is a legacy device (which may not be able to perform the combined process), the UI for entering such a code will not be available. In some such embodiments, the user can enter the password and authentication code at the same time, as a single string. In addition, in some such embodiments, the authentication servers send to the device that is providing the second factor authentication code a notification as a reminder or with instructions regarding how to enter this code on the legacy device.

At this point, the user interaction required for allowing the requesting device 600 to join the synchronization group and the cloud services account is complete. The devices perform the rest of the flow shown in FIG. 3, with the requesting device 600 sending proof of the entered code along with its peer identity for synchronization group joining, the accepting device 650 sending a new second factor authentication code to the requesting device, the requesting device using this code to log into to the cloud services account, and the requesting device then using its now pre-approved peer identity to join the synchronization group. Thus, the sixth stage 630 illustrates that the requesting device 600 has joined both the synchronization group and the cloud services account, and the accepting device 650 is operating normally.

II. Differentiating Between Types of Random Codes

In some embodiments, rather than the combined synchronization group joining and centralized entity authentication process, the user can carry the second code from the accepting device to the requesting device, and use the code only as a second factor for authentication with the centralized entity. In order for the accepting device to determine whether this code is the first type of code (not reproducible by the centralized entity, used for the combined process) or the second type of code (reproducible by the centralized entity, used only for the authentication process), some embodiments use a marker in the code (e.g., one of the digits) that specifies which type of code it is.

For instance, the user might not want a new device to join the synchronization group, or the accepting device providing the code might be offline and unable to communicate with the new device. In other cases, the user might want to participate in the combined group joining process, but due to connections or various other issues, the second PAKE message does not reach the new device when the user requests a random code on a potential accepting device. In some embodiments, the devices provide a fallback mechanism to only have the new device be authenticated for the centralized entity when the accepting device is offline (i.e., does not receive the first PAKE message). For instance, if the first PAKE message is not received by the accepting device and the user requests a randomized authentication code on the device, then the device will provide the user with a second factor authentication code verifiable by the authentication servers, and will not send the second PAKE message to the requesting device.

If the new device incorrectly proceeds as if an entered second factor authentication code is a combined synchronization group and account joining code and therefore sends it to the other devices, this only poses the minor inconvenience of making it slightly more of a hassle to log into the cloud services account. However, if the device proceeds as if an entered code is a second factor authentication code when the code is actually supposed to be used for synchronization group joining as well, this results in the centralized entity gaining a code that can be used (if the centralized entity is taken over by a malicious entity) to join the synchronization group and access the user's secure data.

Thus, some embodiments use a flag at the accepting device to determine whether an input code is for second factor authentication only or for the combined account authorization and group joining process. Some embodiments use a check box or similar mechanism in the UI to allow the user to indicate what type of code she is entering. In other embodiments, in order to avoid complicating matters for the user, an extra digit is used in the code as a flag to indicate which type of code is entered.

Figure 7:
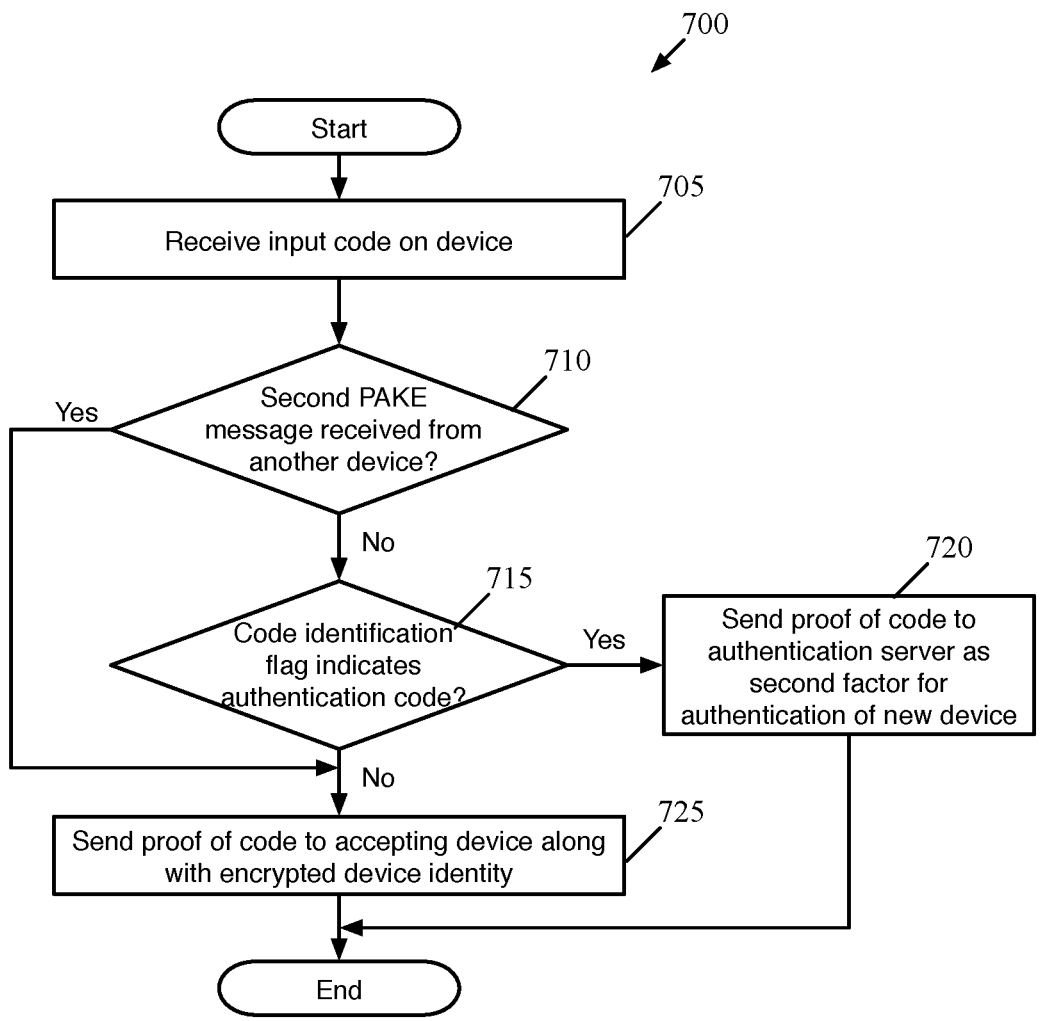
FIG. 7 conceptually illustrates a process of some embodiments performed by a requesting device to determine whether a code input on the device is a second factor authentication code or a combined account verification and synchronization group joining code.

FIG. 7 conceptually illustrates a process 700 of some embodiments performed by a requesting device to determine whether a code input on the device is a second factor authentication code or a combined account verification and synchronization group joining code. As shown, the process begins by receiving (at 705) the input code on the device. As described above, this may take place during device setup, as the user carries a code from an accepting device to the requesting device.

The process then determines (at 710) whether a second PAKE message (i.e., a challenge request for a code, the message 330 in FIG. 3) has been received from any possible accepting device. If such a message has been received, then in some embodiments the device always assumes that the input code is for the combined process, and will not send the code to the authentication server as a matter of precaution. In this case, the process 700 proceeds to operation 720, described below.

If the second PAKE message is not received, then the input code could be a second factor authentication code only. As such, the process determines (at 715) whether the code identification flag indicates that the code is only for second factor authentication. As mentioned, this could be based on user input (e.g., via a checkbox or similar UI mechanism) in some embodiments. In other embodiments, the flag is built into the code itself. For instance, the flag could be simple (e.g., if 0-4, authentication code; if 5-9, combined process code). However, if the user were to make an error typing this one digit, the code would be incorrectly categorized.

As such, some embodiments use a checksum digit designed to prevent the most common input errors from resulting in the incorrect classification of a random combined process code as a second factor authentication code. Specifically, some embodiments use a code with six digits (C0) that are either a random code or a second factor authentication code, and a seventh digit that is a checksum.

The checksum digit C1 is determined such that C1=checksum(C0, f), where f=0 for second factor authentication and f=1 for combined process. The requesting device determines which type of code has been entered (and therefore which process to follow) based on evaluating the condition:

if (checksum(C0, 0)==C1)→second factor authentication;
else→combined account verification and sync group joining; That is, if the checksum of the first six digits along with a 0 matches the last digit, then the requesting device uses the code as only a second factor authentication code. Otherwise, it uses the code as a randomized code for the combined process. This errs in the direction of safety, only sending a code to the authentication servers if the code is very likely to be correct Returning to the process 700, if the code identification flag (e.g., checksum calculation) indicates that the entered code is highly likely to be an authentication-only code, then the process sends (at 720) a proof of the code (e.g., the code in encrypted form, a value derived from the code) to the authentication server as a second authentication factor. Assuming the code (and username/password information) is entered correctly, this leads to the authentication server verifying the device for the centralized services account.

On the other hand, when the code identification flag indicates that the entered code should not be used as an authentication-only code (e.g., because the checksum calculation identifies the code as not a correctly entered authentication-only code, or as a combined process code), the process 700 sends (at 725) a proof of the code to the accepting device along with the encrypted device identity to be used for the combined authentication and synchronization group joining process.

III. Input on Single Device

In the combined authorization process described in Section I, the user account password still needs to be input (or cached, which is not optimal from a security perspective) on the accepting device, thereby requiring a certain amount of user input (e.g., typing) on both the accepting and requesting devices. Some other embodiments, however, only require that the account password and non-reproducible code be input on one of the devices (with the code being generated by the other device). In order to accomplish this without requiring input of the password on the other device, additional operations are performed to add the requesting device to the synchronization group. Because the code generated by one of the devices and input on the other device is used to create a secure channel between the two devices, the devices can effectively send the account password (and/or other data required for the requesting device to join the synchronization group) across this channel in a trusted manner. The processes are slightly different when the input is received on the requesting device as compared to when the input is received on the accepting device, although the basics of the processes are the same.

A. Input on Requesting Device

Figure 8A:
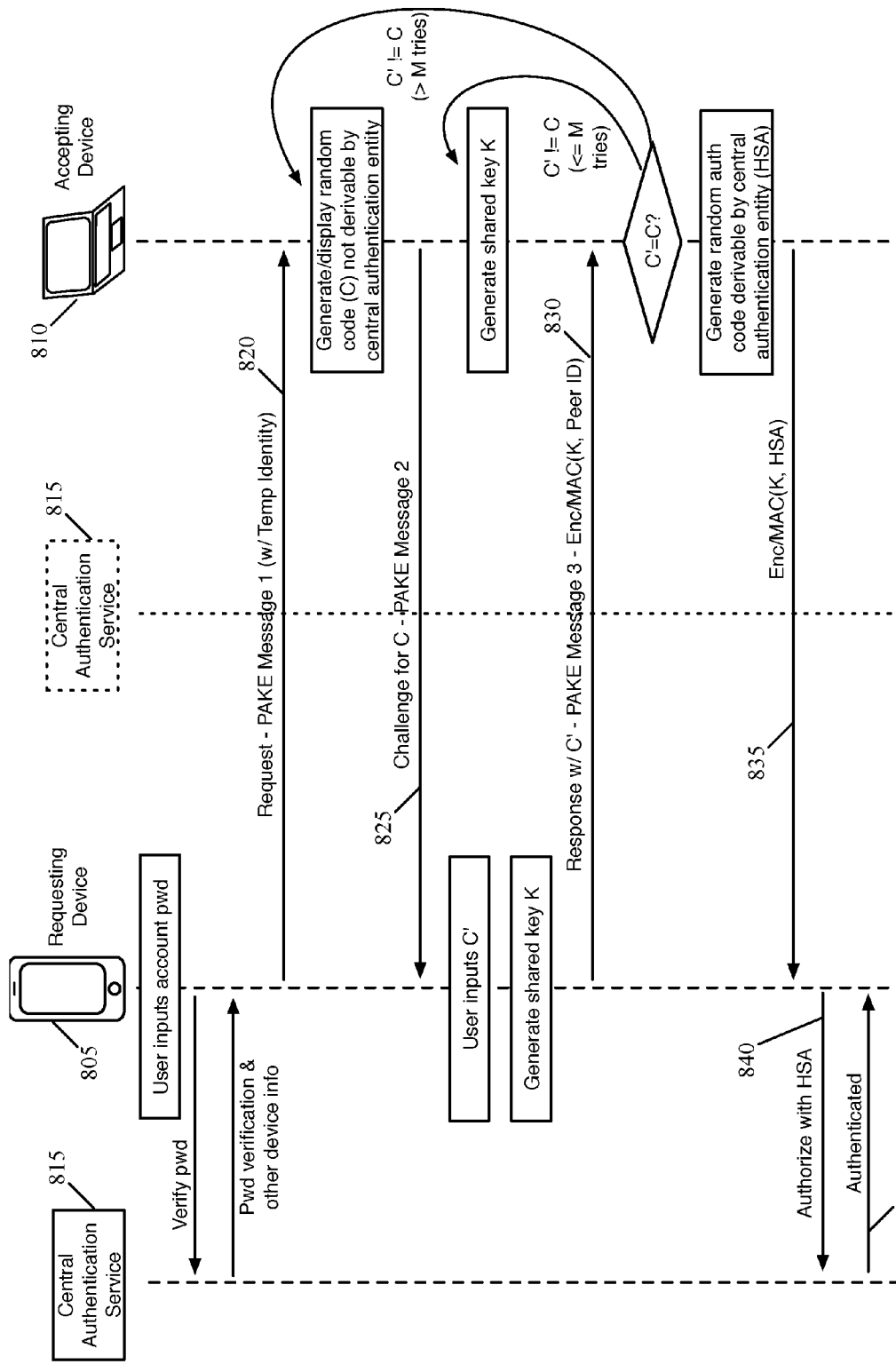
FIG. 8A-B illustrates the interaction between a requesting device and an accepting device when the user provides input of the authentication password and verification code on the requesting device, as a flow diagram showing the messaging between these two devices as well as with a central authentication server (or set of servers).
Figure 8B:
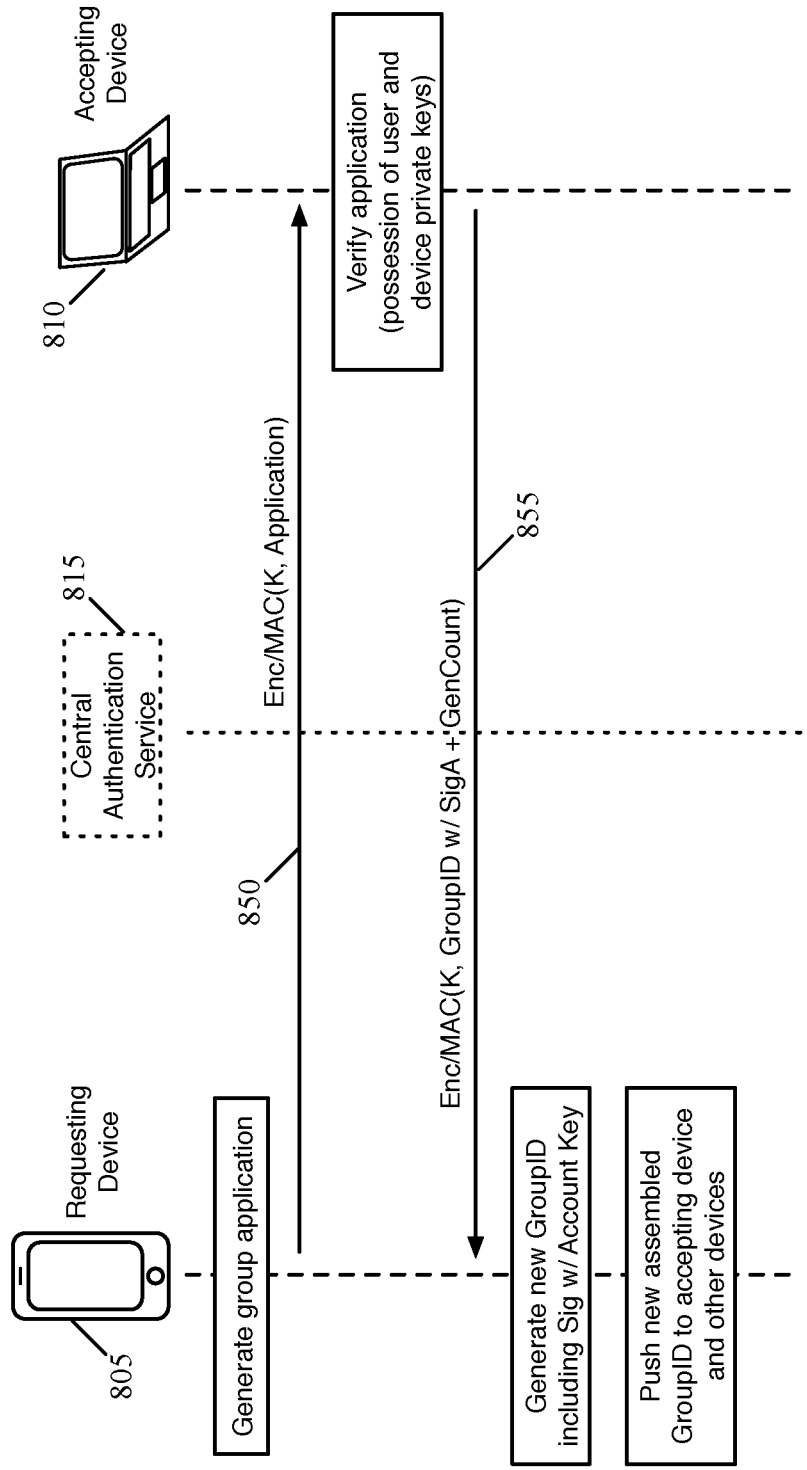

FIG. 8A-B illustrates the interaction between a requesting device 805 and an accepting device 810 when the user provides input of the authentication password and verification code on the requesting device, as a flow diagram showing the messaging between these two devices as well as with a central authentication server 815 (or set of servers). As in the case shown in FIG. 3, the central authentication server 815 is representative of one or more servers that handle authentication for a centralized entity (e.g., a provider of cloud services for which the devices register). As in that example, the authentication server 815 may also serve as an intermediary between the requesting device 805 and the accepting device 810, with the two devices using a PAKE to prevent any attacks or interception of the messages by the authentication server. In other embodiments, the two devices may communicate directly (e.g., via a short-range wireless protocol such as Bluetooth).

In the illustrated example, the accepting device 810 is already authenticated with the central authentication service 815 as a trusted device for a particular user account, and is part of a synchronization group with some or all of the devices authenticated with the central service for the user account. However, for security reasons, the accepting device does not cache the account password or a private key derived from the password (though the accepting device may cache the public key derived from the password, in order to verify whether another device has the private key). As shown in the figure, to begin the combined authorization process, the user inputs the central authentication service password (or other user credential) on the requesting device 805 and indicates for the requesting device to join the synchronization group (not shown). The requesting device 805 sends this information to the central authentication service 815, and (assuming the information was input correctly) receives back an indication that the password was verified as well as information regarding the other devices authenticated for the account (including the accepting device 810), so that the requesting device can contact these devices for the combined authorization process.

Assuming that there is at least one other device that is authenticated for the account and has the capability to provide a second factor authentication code, the requesting device 805 sends a first PAKE message 820. As in the above example, the requesting device of some embodiments actually sends this message to all of the devices in the synchronization group about which the requesting device learns from the central authentication service. As in the example of FIG. 3, in some embodiments the devices use the SRP protocol as the particular PAKE protocol to create a large private key shared between the requesting device 805 and accepting device 810. The cryptographic details of the SRP messages will be omitted in this discussion where these details do not differ from those of the messages described above in Section I.

Upon receiving the initial PAKE message 820, the accepting device 810 (potentially multiple possible devices, such as a user's laptop, desktop, tablet, watch, smart phone, and/or other device) generates and displays a random code (C) that is not derivable by the central authentication entity without using brute force tactics to which the process is resistant. Some embodiments do require user input to at least unlock the accepting device 810 and indicate that a code should be displayed, so that a malicious attacker cannot join a synchronization group with only a password and a stolen device (i.e., the device passcode/password would also be required). The code is generated in a random or pseudo-random manner based on a secure seed in the accepting device 810, and not tied in any way to any property of the device 810 known to the central service. The device 810 then uses the code as an input to create the second PAKE message 825, which it sends to the requesting device 805 and serves as a challenge for the code C.

In rare cases, the accepting device may not have the correct public key for the user account, which will create problems for the combined authorization process. This may occur if, for example, the user changed the account password on a different device (i.e., neither the requesting device 805 nor the accepting device 810) and the accepting device 810 has not received the updated public key derived from the new password (i.e., because it was not connected to a network at the time of the update, and has not synchronized since reconnecting). In this situation, the user is prompted to enter the account password on the accepting device 810.

The requesting device receives the challenge message 825 and provides a prompt for the user to enter the code C' (if entered correctly, C'=C). As described above, different embodiments may use different techniques to provide this code C that the user is required to enter on the new device. For instance, some embodiments display an alphanumeric (or simply numeric) code, which the user types on the requesting device. Other embodiments use a QR code, or similar visual code, and require the user to use the new device to photograph the visual code displayed on the trusted device. Still other embodiments use audio, a set of device movement commands (which only work in the cases that the new device has an accelerometer and/or gyroscope that can detect movements accurately), or other codes that can (i) be replicated on the requesting device and (ii) can be translated into a number useable for the PAKE cryptographic calculations.

At this point, both the requesting and accepting devices 805 and 810 have the information necessary to generate a shared key K, also called a session key. Different embodiments may use different techniques to generate this shared key. In some embodiments, the session key is derived using a key derivation function, such as the HKDF. In some embodiments, the session key K is based on various cryptographic values as well as the code C. Thus, if the code C' is entered incorrectly on the requesting device 805, the shared key will not match and the operations will fail. In some embodiments, the shared key is expanded into two separate keys, one for each direction of the messages.

The requesting device, using the shared key K and the input code C', sends a third PAKE message 830 to verify that the code was entered correctly. In some embodiments, this message 830 includes (i) an answer to the challenge for the input code sent in the second PAKE message 825 and (ii) the peer identity of the requesting device 805 encrypted with the shared key K. In some embodiments, the answer to the challenge is a proof of possession of the input code C', such as a value derived from the input code C' (e.g., a hash value generated from the input code). Using a hash value or other value generated from a one-way function prevents a man in the middle attack in which the centralized entity intercepts the code and uses the code to introduce an unauthorized device as a requesting device.

Upon receiving the response message 830, the accepting device 810 determines whether the input code C' matches the generated code C. When the requesting device 805 sends data generated based on input code C' (e.g., a hash value), the accepting device 810 performs the same computations to generate data based on the generated code C. If these values match, then the accepting device concludes that the user is in possession of both devices and has entered the code correctly.

However, if the input code does not match the generated code, then the user will have to input the code again. In some embodiments, the accepting device 810 only allows a threshold number of attempts at a particular code, to prevent any sort of brute force guessing of the code. Thus, the accepting device performs different actions next depending on the number of failed attempts at a particular code that it generated. As shown, if the number of attempts is less than the threshold M, then the accepting device 810 awaits another attempt at the code, in which case the user enters a new code C' on the requesting device 805, in hopes that this time C'=C. However, if the threshold number of attempts have been made at the first code, then the device generates and displays a new random code (again, not derivable by the central authentication entity), and resends a new challenge message 825. In addition, in some embodiments, the accepting device 810 sends an error message (not shown) to the requesting device 805 each time a message 830 is received from the requesting device with an incorrect code attempt. This error message causes the requesting device 805 to return to its state after receiving the second message 825. Other embodiments, however, only send such an error message when the accepting device re-generates a new code.

Once the code has been correctly input on the requesting device 805 and verified by the accepting device 810, the accepting device generates a new random code HSA derivable by the central authentication entity. This second factor authentication code is generated based on a seed data known to the central authentication service 815, and thus differs from the random code C. The seed data is specific to the device, and in some embodiments the code HSA generated from the seed data varies randomly over time in a deterministic manner reproducible by the central authentication entity. The accepting device sends a message 835 with this new code HSA encrypted using the session key K.

The requesting device 805 decrypts this code (using the shared session key K) and uses the code to authenticate itself with the central authentication service 815. In some embodiments, this grants the device 805 access to the user's cloud services account. The device uses the cloud services account name and password to identify the account and provide an initial authentication factor, then uses the HSA code as a second authentication factor to prove that the user of the requesting device 805 is in possession of at least one trusted device associated with the account. The authorization attempt message 840 sent to the authentication service 815 and the authentication verification message 845 received in reply may be single messages or representative of several messages sent back and forth between the requesting device and the authentication service in different embodiments.

After having been authorized with the central authentication service 815, the requesting device 805 begins the process of joining the synchronization group, without the need for any additional user input. As shown in FIG. 8B, the requesting device generates an application to the synchronization group. In some embodiments, this application includes the public peer identity of the requesting device 805 signed with its own device private key as well as a private key for the user account, which is generated based on the account password. The device private key of some embodiments is generated based on random (and secure) seed data specific to the requesting device. The requesting device 805 sends the application via a message 850 using the secure channel by encrypting the application with the shared key K.

The accepting device 810 has the public user key (though not the private user key) as well as the requesting device's public key and thus can verify the application sent by the requesting device 805. The accepting device performs this verification operation and, assuming the application is valid, would normally send out a group definition adding the new requesting device 805 to the group. However, a valid group definition includes the group data (e.g., a list of the devices in the group as well as a monotonically increasing generation count that indicates the generation of the group) signed using the private key of the accepting device and the private key for the user account (i.e., one of the private keys used to sign the application).

Because the accepting device 810 does not cache the account password (or the private key based on the account password), and the user has only input data on the requesting device 805, the accepting device is not able to generate a valid group definition with the proper signatures. However, it is able to create the list of devices as well as the generation count, and sign this information with its private key. The accepting device 810 sends this data with the first signature to the requesting device 805 in a message 855, also encrypted with the shared key K.

Figure 9:
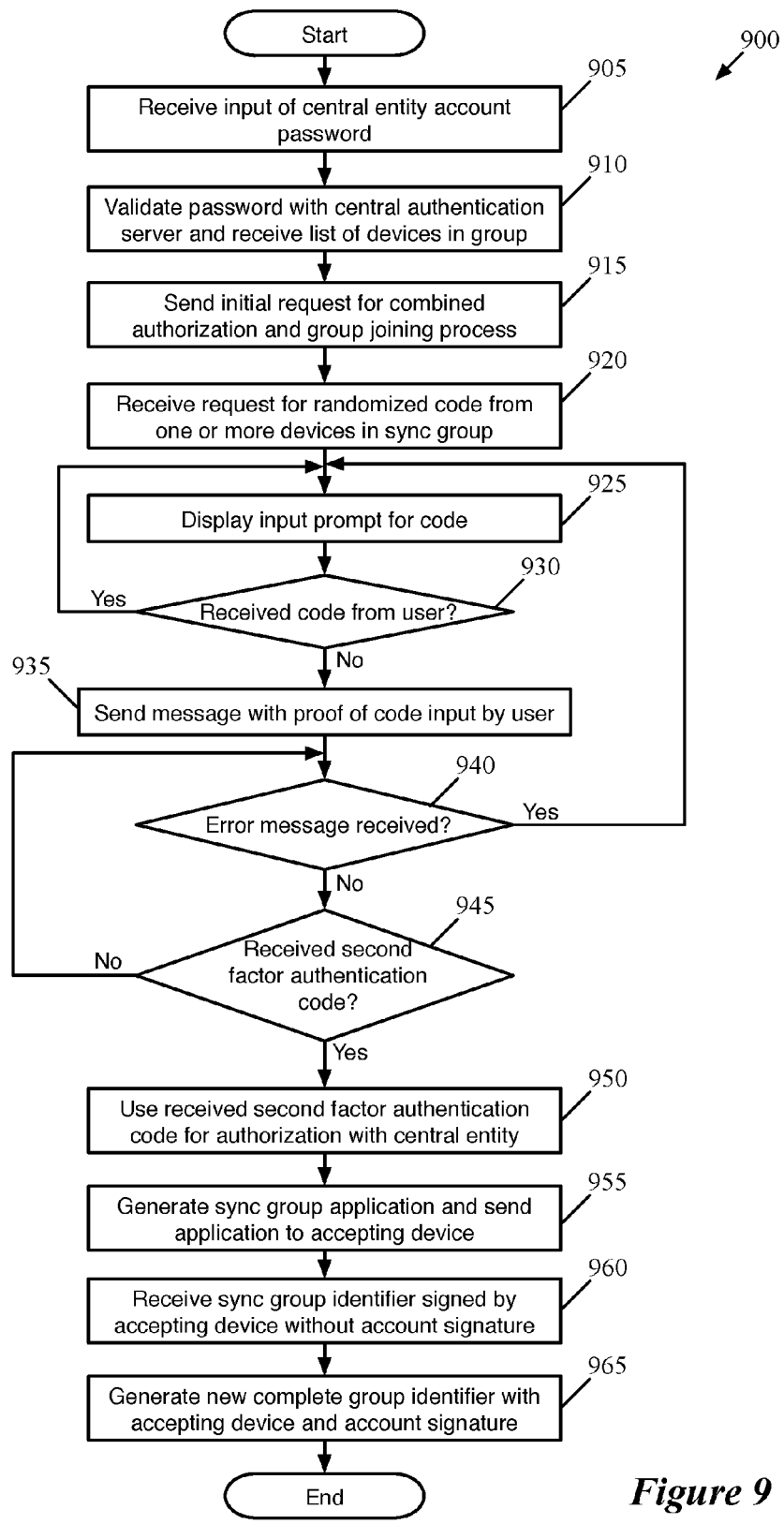
FIG. 9 conceptually illustrates a process of some embodiments performed by the requesting device to both join a synchronization group and be authorized for an account with a central service entity, when the user input is limited to the requesting device.

The requesting device 805 can thus generate the completed group definition GroupID by signing the received data with the account key derived from the account password input on the requesting device at the start of the process. The requesting device 805 can then either send this GroupID to the accepting device 810 via the secure channel (using the shared key K) or push the GroupID to all of the devices in the group, as would normally be done by the accepting device in a standard group joining process. In this case, the creation of a trusted, secure channel allows for the responsibility of signing the group definition to be passed from the accepting device to the requesting device that is applying to the group. Furthermore, some embodiments use the secure channel to perform all of the subsequent operations relating to the new group membership 1. Requesting Device Process FIG. 9 conceptually illustrates a process 900 of some embodiments performed by the requesting device (e.g., the device 805) to both join a synchronization group and be authorized for an account with a central service entity, when the user input is limited to the requesting device. In some embodiments, the process 900 is performed at the time of device setup—e.g., when a user acquires a new device, resets to original settings on an existing device, etc. In other embodiments, the process 900 begins at the behest of a user after the device has been set up (for instance, if the user did not want to have the device join the synchronization group and log into the centralized entity at the time of device setup).

As shown, the process 900 begins by receiving (at 905) input of the central service account password. In some embodiments, the device prompts the user for the password once the user indicates the desire to have the device log into the central service account and join the synchronization group. Next, the process validates (at 910) the input password with the central authentication server and in response (assuming the password is correct) receives a list of devices in the group. If the password is incorrect, on the other hand, the device will receive a message from the central authentication entity indicating as such, and will prompt the user to try inputting the password again. Once the user has input the password on the requesting device, the device will have the ability to use this password (e.g., to derive a user account key pair from the password) throughout the combined authorization process, although in some embodiments the device does not store the password afterwards for security purposes (for this same reason, the accepting device will not have the password or private key derived from the password during the combined authorization process).

Once the device has started the initial authorization with the central authentication entity, the process sends (at 915) an initial request to start the combined authorization and synchronization group joining process. In some embodiments, the device sends this message to all of the devices in the sync group, the identities of which the device learns about in response to the user correctly entering the account password on the device. In other embodiments, the device sends the message to the authentication service of the central service entity, which distributes the message to the other devices. As described above, in some embodiments the device calculates a first value A (a client public key value) and sends this value to the other devices in the synchronization group. In addition, the requesting device sends a temporary device identity along with the initial request message in some embodiments. This is an identity used by the device only temporarily for the purpose of initiating the combined authorization and synchronization group joining process, and is different than the identity used later to actually join the group.

Next, the process receives (at 920) a request for a randomized code value from one or more devices in the synchronization group. In some embodiments, each of the devices to which the message was sent may send such a request (i.e., the request described above as the second message 825). However, the devices only send such a request if the user turns on and unlocks the device, prompting the device to display the randomized code and send the challenge message to the requesting device. Typically, the user will only go to one of her existing devices to generate the code, and thus only one request will be received. However, in some cases, multiple such request messages are received. As described above, in some embodiments the received request message includes a public key value B (referred to as the "server" public key) for setting up the PAKE.

The process 900 also displays (at 925) an input prompt for a code (e.g., a box into which the user can type the code, whether through a keyboard, touchscreen, or other input device), and waits for the user to provide a code attempt as input. Some embodiments display this input prompt irrespective of whether a request (second PAKE message) has been received, displaying the prompt as soon as the initial request has been sent at 915. The process determines (at 930) whether code has been input, and continues to display the prompt (at 925) until such input is received (or until the user cancels the operation, which is not shown in the flow chart). Though shown as a determination (at 930), one of ordinary skill will recognize that some embodiments do not make such a repeated determination operation, but instead enter a wait state until the user enters the code, which prompts subsequent operations of the device.

Upon receiving the code, the process sends (at 935), to all of the devices from which a request was received, a message that includes (i) a proof of the code input by the user (e.g., a value derived from this code) and (ii) a peer identity for joining the synchronization group. As described above by reference to FIG. 8, in some embodiments the peer identity is encrypted with a symmetric key derived in part from the code input by the user, or with one of two keys derived in part from the code (i.e., the key for sending messages from the requesting device to the accepting device). In some embodiments, the user specifies on which device the input code was generated and displayed, and the message is only sent to that device at 935. However, in other embodiments, the process does not know from which device the corresponding message was received, and therefore sends the message at 935 to all of the devices from which a request was received at 920.

The device then awaits to receive the next response from an established accepting device. As shown, the process determines (at 940) whether an error message was received. When the user inputs the code incorrectly into the requesting device and this device sends the incorrect code to the accepting device at 935, then the accepting device returns an error message in some embodiments. Upon receiving this error message, the process returns to 925 to display the prompt and receive another attempt to input the code. Though not shown, if the user inputs the wrong code at least a threshold number of times, the accepting device will generate a new random code, in order to thwart any brute force attempt at the code.

However, assuming no error message is received, the device also determines (at 945) whether a message with an encrypted second factor authentication code has been received from one of the other devices already established in the synchronization group (i.e., one of the devices to which the input code was sent at 935). This message is only received if the code is entered correctly at operation 930 and sent to the accepting device on which the code was generated. The second factor authentication code, in some embodiments, is similar to the code displayed by the accepting device and entered at 930, but is reproducible by the authentication servers. This second factor authentication code is generated based on a seed data known to the central authentication service, and thus differs from the random code entered by the user. The seed data is specific to the device, and in some embodiments the code generated from the seed data varies randomly over time in a deterministic manner reproducible by the central authentication entity.

If neither an error message nor a message with the second factor authentication code is received, the process 900 returns to 940 (i.e., continues to wait for a reply). One of ordinary skill will recognize that, again, this is a conceptual representation of the process performed by the requesting device. For instance, even if the requesting device receives multiple challenge requests, then it will send the input code to multiple possible accepting devices, and the code will be incorrect for at least one of these possible accepting devices. Some embodiments only return to 925 if error messages come from all of the devices to which the code was sent. In other embodiments, if an error message is received from a first device, the process 900 returns to 925, but cuts out to operation 950 if a message with a second factor authentication code is subsequently received.

Once the second factor authentication code is received, the process 900 uses (at 950) the received second factor authentication code to authorize itself with the central entity (e.g., the cloud services entity). In some embodiments, the requesting device uses the cloud services account name and password (input at the start of process 900) to identify the account and provide an initial authentication factor, then uses the newly received code as a second authentication factor to prove that the user of the requesting device is in possession of at least one trusted device associated with the account.

Next, having been authorized with the central authentication server, the process 900 generates (at 955) an application for the synchronization group and sends this application to the accepting device (i.e., the device from which the second factor authentication code was received). As described above by reference to FIG. 8, in some embodiments the requesting device generates this application by signing its peer identity (public device information) with (i) a private user key based, at least in part, on the central services account password, and (ii) a private device key generated based on random seed data on the requesting device.

Assuming the application is valid (i.e., the signatures prove possession of the requisite private keys, thereby proving possession of the central services account and device passwords/passcodes), the process 900 receives (at 960) a synchronization group identifier signed by the accepting device using its private device key but without a signature using the private user account key. Because the user has not entered the account password on the accepting device, that device is not able to completely add the requesting device to the synchronization group. However, the device can prepare the acceptance (which normally consists of sending out a new group identifier that includes the newly added device, a generation count, signed by both the private key of one of the devices already in the group and the user account key), and send this to the new device using the secure PAKE channel.

The process 900 then generates the complete new group identifier by adding a signature using the private user account key, as the requesting device has the password data needed to generate that key (and has in fact already used the key to sign its application). Though not shown in the figure, the requesting device then either pushes this group identifier to all devices in the group, or sends the completed group identifier across the secure channel to the accepting device (which can push it to all of the devices in the group).

2. Accepting Device Process

Figure 10:
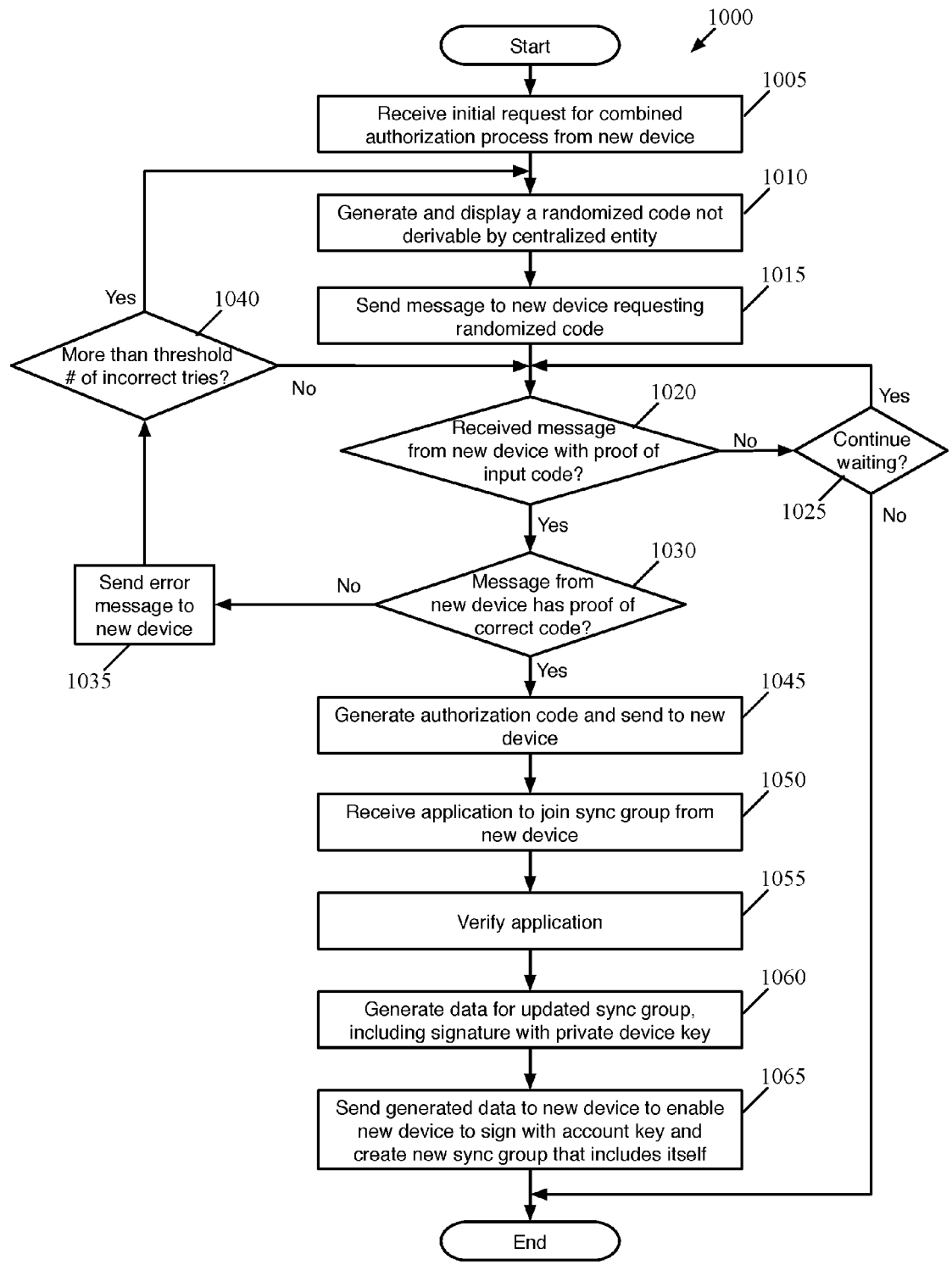
FIG. 10 conceptually illustrates a process of some embodiments performed by an accepting device to allow a requesting device to join a synchronization group of which the accepting device is a part and enable the requesting device to log into a central services account.

FIG. 10 conceptually illustrates a process 1000 of some embodiments performed by an accepting device (e.g., the device 810) to allow a requesting device to join a synchronization group of which the accepting device is a part and enable the requesting device to log into a central services account. In this example, the accepting device has previously registered with the central services account, but does not currently store the password for this account (or a private key derivable from the password). As shown, the process 1000 begins by receiving (at 1005) an initial request for a combined authorization and group joining process from a new device. As noted above, the new device may be a brand new device for the user, or the user may have reset the device operating system, such that the device is effectively new and must rejoin the synchronization group and central services account. The request message, in some embodiments, is the first message of a PAKE, and includes a client public key value A.

After receiving the request message from the new device, the process 1000 generates and displays (at 1010) a randomized code not derivable or reproducible by a centralized authentication entity. In some embodiments, the messages are sent through the centralized authentication servers (that authenticates the login credentials for the centralized entity), and thus (i) a PAKE is used to avoid man-in-the-middle attacks and (ii) a random code is generated in such a way as to preclude the centralized authentication entity from using the code, combined with knowledge of the user account name and password, to join the synchronization group and receive access to the user's secure data. In some embodiments, as a further security measure, the accepting device performing the process 1000 requires the user to input a device passcode before displaying a random code at 1010. This makes it more difficult for an unauthorized user to get a code used for joining a synchronization group and the central services account.

In addition to generating and displaying the randomized code, the process sends (at 1015) a message to the new device requesting the randomized code (or requesting proof of the code). In some embodiments, this message includes a public key value B for the PAKE (the "server" public key), calculated as described above. This message prompts the requesting device to display an input dialog for the user to input the code displayed by the accepting device in some embodiments (in other embodiments, the requesting device displays the input dialog irrespective of whether the message is actually received from an accepting device), and send back either the input code itself or data derived from the code that can be used as proof that the code was input correctly.

After sending the challenge message to the requesting device, the process 1000 awaits a message from the requesting device containing the code input on that device or a proof derived from the input code. Thus, the process determines (at 1020) whether a message has been received from the new device with a proof of the input code (e.g., a value derived from the input code). If no such message has been received, the process determines (at 1025) whether to continue waiting for such a message. If the process should not continue waiting, the process 1000 ends. Otherwise, the process returns to 1020 to continue awaiting a message from the new device. The process may end prematurely if, e.g., the user cancels the operation, powers off the accepting device performing the process 1000, etc. In addition, one of ordinary skill in the art will recognize that this is a conceptual process, and that the process running on the accepting device would essentially enter a wait state until the message is received from the requesting device, causing the accepting device to proceed to operation 1030.

When the process 1000 does receive a message from the new requesting device, the process determines (at 1030) whether the new device has received a correct proof of the code (i.e., the code displayed by the device at 1010). As described above, in some embodiments the new device sends a value generated from the input code (e.g., a hash value generated from the code) rather than the code itself. In this case, in order to determine whether the input code on the new device is correct, the accepting device performs the same computation to generate the proof from the displayed random code, and determines whether this matches the received proof.

When the accepting device determines that the input code does not match the code that it generated, the process sends (at 1035) an error message to the new device to indicate that the code was incorrect and that the user should re-enter the code on the device. The process 1000 also determines (at 1040) whether the code has been input incorrectly more than a threshold number of times. Some embodiments only allow the user to make a certain number of attempts (e.g., 2, 3, 5, 10, etc.) at inputting a particular generated code, so as to eliminate brute force guessing at the code. As such, if the accepting device has received more than the threshold number of messages indicating code input attempts, the process returns to 1010 to generate and display a new random code, and send another challenge message to the new device with a new public key B (computed using the new random code). If the number of attempts at the current code is less than the threshold amount, the process returns to 1020 to await another message with an attempt at the current code.

On the other hand, if the message from the new device indicates that the user has input the code correctly on the new device, the process 1000 proceeds based on the premise that the user has proven possession of both devices and the centralized services account password. Thus, the process 1000 generates (at 1045) a randomized code reproducible by the centralized entity, and sends this new randomized code to the new (requesting) device for use in authenticating the requesting device with the centralized entity. As described above, in some embodiments the accepting device encrypts this randomized code with the shared session key K or a portion of the shared key used for messages from the accepting device to the requesting device, before sending the code.

The randomized code generated at 1045 is also referred to as a second factor authentication code because it is used, along with the username and password of the centralized services account (the first authentication factor), to authenticate the device with the centralized services entity. The second factor authentication code, in some embodiments, is similar to the code generated at 1010, but is reproducible by the authentication servers. This second factor authentication code is generated based on a seed data known to the central authentication service, and thus differs from the first random code that is not derivable by the centralized entity. The seed data is specific to the device, and in some embodiments the code generated from the seed data varies randomly over time in a deterministic manner reproducible by the central authentication entity.

Once the requesting device receives this code, it can authenticate itself with the central authentication servers as described above. Once this authentication is complete, the requesting device turns to joining the synchronization group. Thus, the process 1000 receives (at 1050) an application to join the synchronization group from the new requesting device. As indicated above, the application is fully signed (by both the private device key of the requesting device and the private user account key) in this case because the requesting device has possession of the central services password. The application, in some embodiments, is sent from the requesting device via the secure PAKE channel by encrypting the application with the shared key.

The process 1000 then validates (at 1055) this application to the group. Although the accepting device does not have the user account password or the private key derived therefrom, it does retain possession of the public key and thus can use this public key to validate the signature. Similarly, the public identity of the requesting device includes that device's public key, which the process 1000 uses to validate the device signature on the application.

Assuming the application is valid, the process 1000 generates (at 1060) updated data for the synchronization group, including a signature of the updated group identifier with the accepting devices' private key. This data includes a list of the devices in the group as well as a new generation count (determined by incrementing the previous generation count for the group). In some embodiments, each time a synchronization group changes (e.g., a member joins or leaves, its data sharing policies change, etc.), the device approving the change increments the generation count. A properly signed group identifier (that specifies the members of the group, etc.) has both a signature using the private key of one of the devices already in the group (the accepting device in this case) as well as the private user account key. In this case, the accepting device cannot fully add the new device to the group, so it only signs with its private key.

The process 1000 thus sends (at 1065) the generated data to the new device, thereby enabling the new device to sign this data with the user account private key, and distribute the new, properly signed group identifier. The accepting device, in some embodiments, uses the shared key for the secure channel to send the synchronization group data. The process 1000 then ends, with the requesting device having validated itself with the authentication server and with the ability to add itself to the synchronization group.

B. Input on Accepting Device

Different but corresponding issues are encountered when the password and code are input on the accepting device (and not on the requesting device). In this case, the user initially enters the account password on the accepting device (and indicates in some manner that the requesting device should join the group and be authorized with the centralized account). The requesting device thus generates and displays the non-reproducible code, which the user carries to and inputs on the accepting device. As in the above-described embodiments, the input code is used to create a secure channel over which the accepting device sends the authorization code, allowing the requesting device to be authorized with the centralized entity.

Figure 11A:
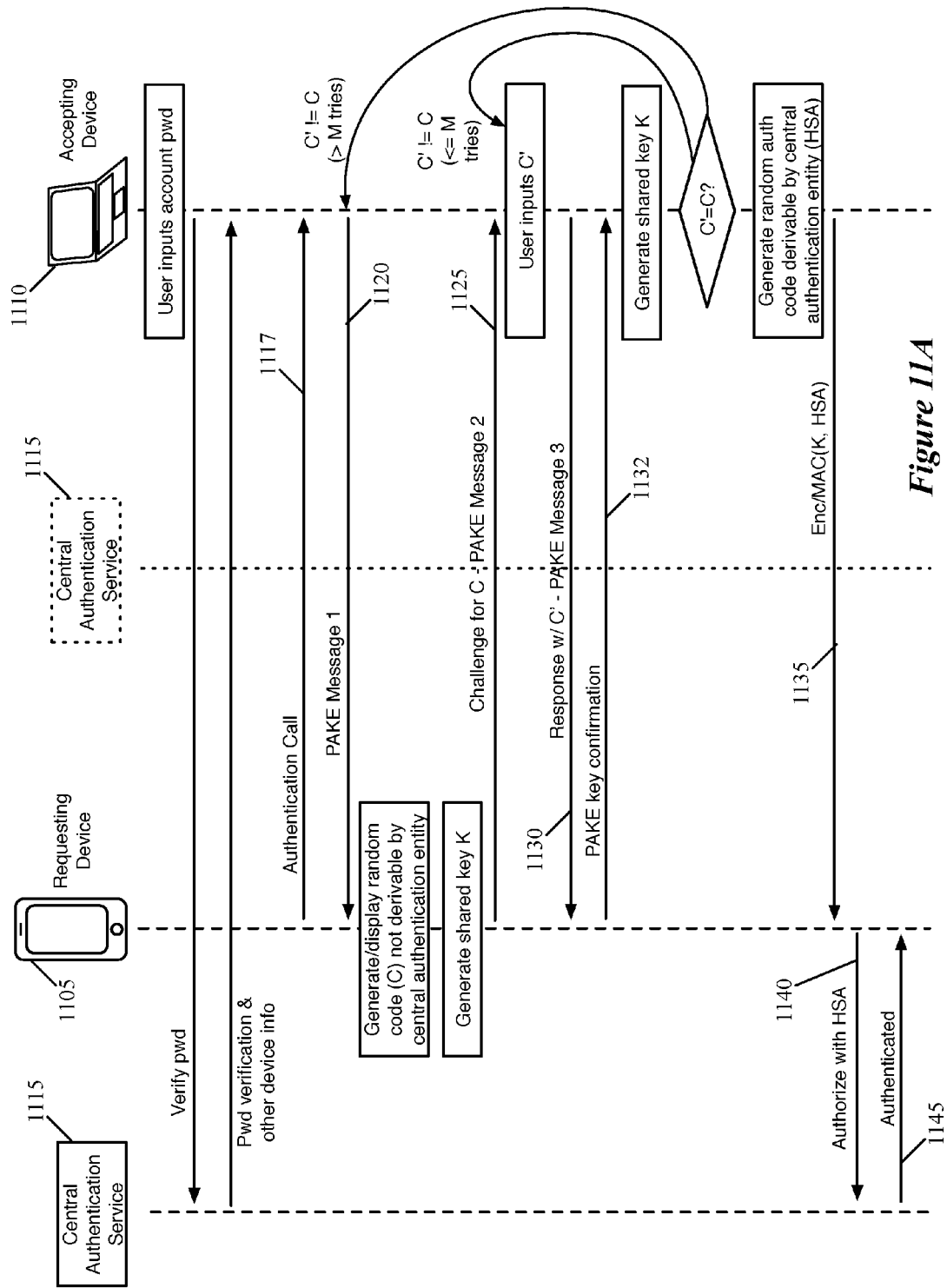
FIG. 11A-B illustrates the interaction between a requesting device and an accepting device when the user provides input of the authentication password and verification code on the accepting device, as a flow diagram showing the messaging between these two devices as well as with a central authentication server (or set of servers).
Figure 11B:
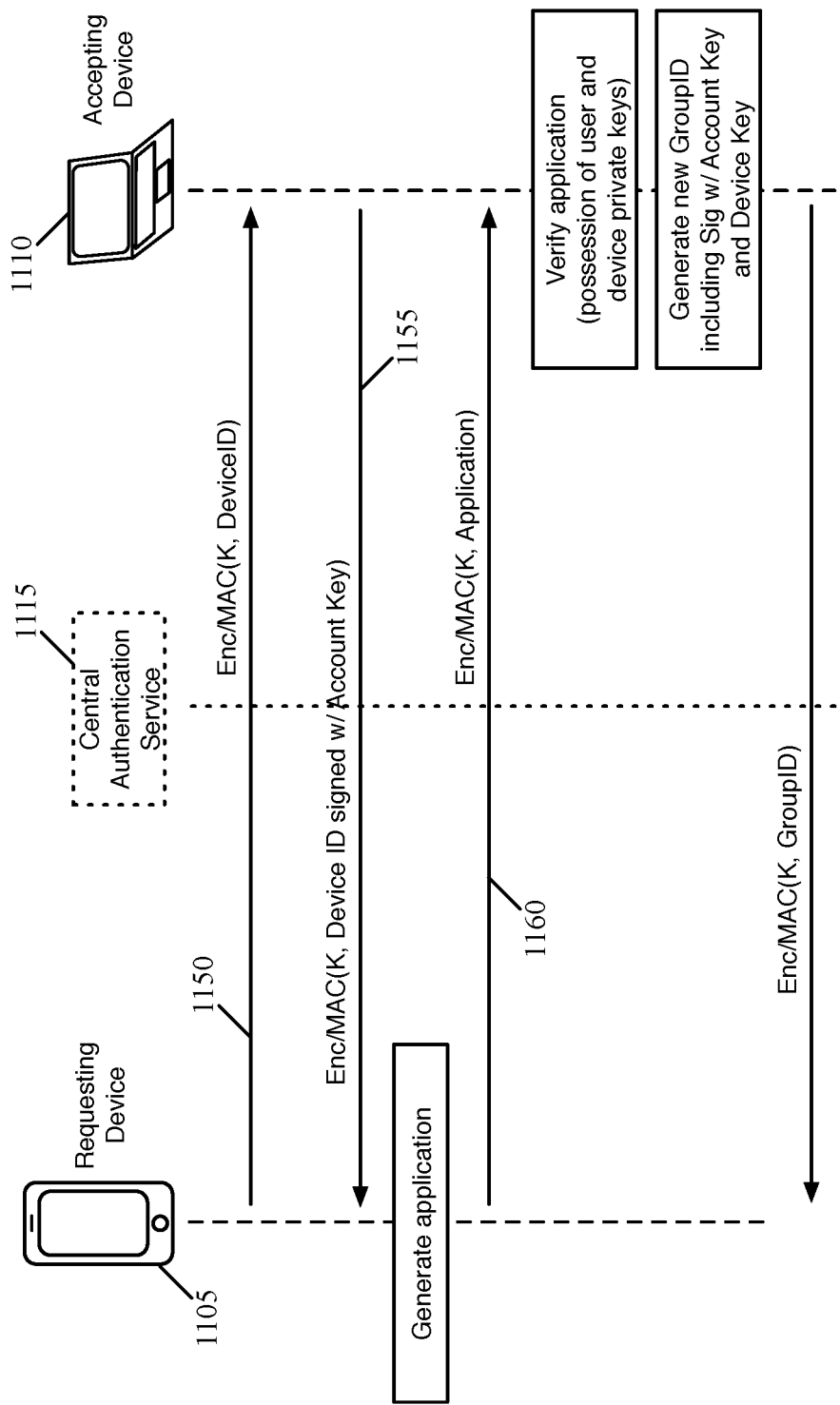

FIG. 11A-B illustrates the interaction between a requesting device 1105 and an accepting device 1110 when the user provides input of the authentication password and verification code on the accepting device (rather than the requesting device), as a flow diagram showing the messaging between these two devices as well as with a central authentication server 1115 (or set of servers). As in the cases shown above in FIGS. 3 and 8, the central authentication server 1115 is representative of one or more servers that handle authentication for a centralized entity (e.g., a provider of cloud services for which the devices register). As in that example, the authentication server 1115 may also serve as an intermediary between the requesting device 1105 and the accepting device 1110, with the two devices using a PAKE to prevent any attacks or interception of the messages by the authentication server. In other embodiments, the two devices may communicate directly (e.g., via a short-range wireless protocol such as Bluetooth). In some embodiments, such a short-range protocol is preferred for the case in which the password and code are input on the accepting device, as the requesting device will have not yet authenticated with the central service to learn the other devices associated with the user account.

In the illustrated example, the accepting device 1110 is already authenticated with the central authentication service 1115 as a trusted device for a particular user account, and is part of a synchronization group with some or all of the devices authenticated with the central service for the user account. However, for security reasons, the accepting device does not cache the account password or a private key derived from the password (though the accepting device may cache the public key derived from the password, in order to verify whether another device has the private key). As shown in the figure, to begin the combined authorization process, the user inputs the central authentication service password (or other user credential) on the accepting device 1110 and indicates for the requesting device to join the synchronization group (not shown). If the requesting device is, for example, a watch, streaming video device, or other device on which input is not as easy as on the accepting device, then some embodiments use the process shown in FIG. 11 so that the user does not have to provide the input on the requesting device. The accepting device 1110 sends the password information to the central authentication service 1115, and (assuming the information was input correctly) receives back an indication that the password was verified.

The requesting device 1105 then sends an authentication call message 1117 to the accepting device 1110. While this and subsequent messages are shown in the figure as being communicated through the central authentication servers 1115, as mentioned above some embodiments use a direct short-range communication protocol for the messages between devices (including the PAKE messages and subsequent synchronization group authorization messages). In response to the authorization call, the accepting device sends the first PAKE message 1120. As in the above examples, the devices 1105 and 1110 of some embodiments use the SRP protocol to create a large private key shared between the two devices. The cryptographic details of the SRP messages will be omitted in this discussion where these details do not differ from those of the messages described above in Section I. However, in this case, the accepting device acts as the SRP "client" (i.e., providing the first PAKE message) while the requesting device acts as the SRP "server" (i.e., providing the second PAKE message with the public key based in part on the generated code).

Upon receiving the initial PAKE message 1120, the requesting device 1105 generates and displays a random code (C) that is not derivable by the central authentication entity without using brute force tactics to which the process is resistant. While some embodiments do require user input to at least unlock the requesting device 1105 and indicate that a code should be displayed, so that a malicious attacker cannot join a synchronization group with only a password and a stolen device (i.e., the device passcode/password would also be required), in general the user would have already unlocked the requesting device to begin the process. The code is generated in a random or pseudo-random manner based on a secure seed in the requesting device 1105, and is not tied in any way to any known property of the device 1105. The device 1105 then uses the code as an input to create the second PAKE message 1125, which it sends to the accepting device 1110 and serves as a challenge for the code C.

At this point, the requesting device 1105 has the information necessary to generate a shared key K, also called a session key. Different embodiments may use different techniques to generate this shared key. In some embodiments, the session key is derived using a key derivation function, such as the HKDF. In some embodiments, the session key K is based on various cryptographic values as well as the code C. Thus, if the code C' is entered incorrectly on the accepting device 1110, the shared key will not match and the operations will fail. In some embodiments, the shared key is expanded into two separate keys, one for each direction of the messages.

The accepting device 1110 receives the message 1125 and provides a prompt for the user to enter the code C' (if entered correctly, C'=C). As described above, different embodiments may use different techniques to provide this code C that the user is required to enter on the accepting device. For instance, some embodiments display an alphanumeric (or simply numeric) code, which the user types on the accepting device. Other embodiments use a QR code, or similar visual code, and require the user to use the accepting device to photograph the visual code displayed on the new device. Still other embodiments use audio, a set of device movement commands (which only work in the cases that the accepting device has an accelerometer and/or gyroscope that can detect movements accurately), or other codes that can (i) be replicated on the accepting device and (ii) can be translated into a number useable for the PAKE cryptographic calculations.

The accepting device, using the input code C, sends a third PAKE message 1130 to the accepting device. In some embodiments, this message 1130 includes an answer to the challenge for the code sent in the second PAKE message 1125. In some embodiments, the answer to the challenge is a proof of possession of the generated code C, such as a value derived from the code C (e.g., a hash value generated from the code). Using a hash value or other value generated from a one-way function prevents a man in the middle attack in which the centralized entity intercepts the code and uses the code to introduce an unauthorized device as a requesting device. The requesting device 1105 receives this third PAKE message, and sends a confirmation message 1132 to the accepting device 1110.

At this point, the accepting device 1110 also has the information necessary to generate the shared session key K. Upon receiving the response message 1130, the accepting device 1110 determines whether the input code C' matches the generated code C. Because the accepting device does not actually have the value C, in some embodiments it determines whether its shared key K generated from C' works for the message received from the requesting device.

If the input code does not match the generated code, then the user will have to input the code again. In some embodiments, the accepting device 1110 only allows a threshold number of attempts at a particular code, to prevent any sort of brute force guessing of the code. Thus, the accepting device performs different actions next depending on the number of failed attempts at a particular code (i.e., since the last challenge message 1125). As shown, if the number of attempts is less than the threshold M, then the accepting device 1110 prompts the user to input the code again on the accepting device. However, if the threshold number of attempts have been made at the first generated code, then the accepting device 1110 sends a new first PAKE message 1120, effectively requesting a new code from the requesting device 1105. In addition, in some embodiments, the accepting device 1110 sends an error message (not shown) to the requesting device 1105 when the accepting device requires the requesting device to re-generate a new code.

Once the code C has been correctly input on the accepting device 1110, the accepting device generates a new random code HSA derivable by the central authentication entity. This second factor authentication code is generated based on a seed data known to the central authentication service 1115, and thus differs from the random code C. The seed data is specific to the accepting device, and in some embodiments the code HSA generated from the seed data varies randomly over time in a deterministic manner reproducible by the central authentication entity. The accepting device sends a message 1135 with this new code HSA encrypted using the session key K.

The requesting device 1105 decrypts this code (using the shared session key K) and uses the code to authenticate itself with the central authentication service 1115. In some embodiments, this grants the device 1105 access to the user's cloud services account. The device uses the HSA code as an authentication factor to prove that the user of the requesting device 1105 is in possession of at least one trusted device associated with the account, and the fact that the password was sent by the trusted device as proof that the user knows the required password. That is, because the accepting device is already registered with the cloud service account, it is allowed to register the requesting device with the password. The authorization attempt message 1140 sent to the authentication service 1115 and the authentication verification message 1145 received in reply may be single messages or representative of several messages sent back and forth between the requesting device and the authentication service in different embodiments.

After having been authorized with the central authentication service 1115, the requesting device 1105 begins the process of joining the synchronization group, without the need for any additional user input on either device. As shown in FIG. 11B, in this case the device cannot generate an application to the synchronization group because it does not possess the private key generated from the account password. Instead, the requesting device 1105 sends its public peer identity over the secure channel to the accepting device 1110 via a message 1150. At this point, the peer identity is not yet signed with either of the requisite signatures.

The accepting device 1110 knows that it can trust the requesting device 1105, and thus signs the received peer identity with the account key, to create a partially completed application for the requesting device. The accepting device sends this partially completed application via a message 1155, again encrypting it with the shared session key. The requesting device 1105 can then complete the application by signing it with its own private key, and sends the completed application to the accepting device via a message 1160 (again over the secure channel using the shared key). Thus, the requesting device 1105 is able to generate the complete application without actually knowing the password, by offloading this signature to the accepting device 1110 via the secure channel.

At this point, the accepting device 1110 can add the requesting device 1105 to the synchronization group by assembling a complete group identifier and sending this to either the requesting device via the secure channel (shown as message 1165) or to all of the devices in the synchronization group. In this case, the application requires the use of the secure channel while the validation proceeds as normal, as opposed to the situation above in which the application is generated normally but the validation requires the use of the secure channel for the user account signature.

1. Requesting Device Process

Figure 12:
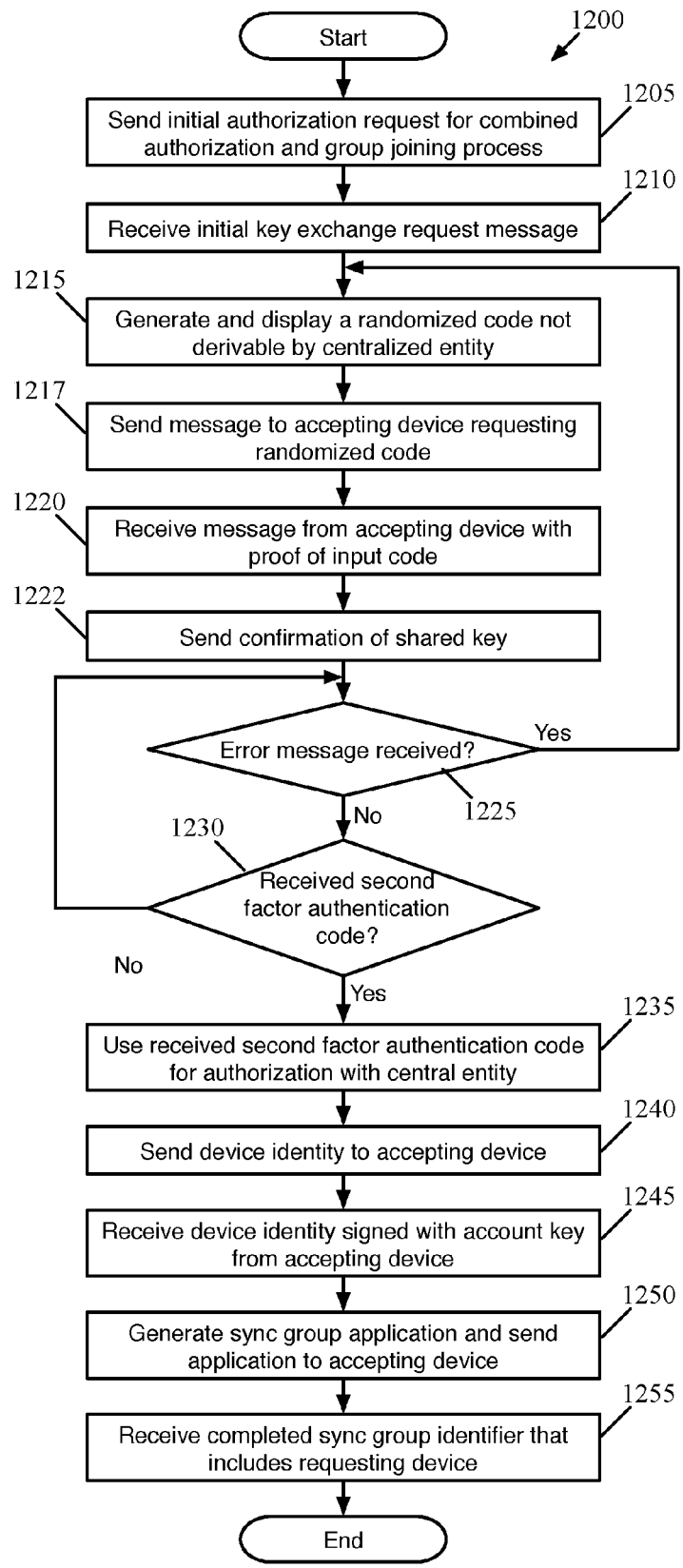
FIG. 12 conceptually illustrates a process of some embodiments performed by the requesting device to both join a synchronization group and be authorized for an account with a central service entity, when the user input is limited to the accepting device.

FIG. 12 conceptually illustrates a process 1200 of some embodiments performed by the requesting device (e.g., the device 1105) to both join a synchronization group and be authorized for an account with a central service entity, when the user input is limited to the accepting device. In some embodiments, the process 1200 is performed at the time of device setup—e.g., when a user acquires a new device, resets to original settings on an existing device, etc. In other embodiments, the process 1200 begins at the behest of a user after the device has been set up (for instance, if the user did not want to have the device join the synchronization group and log into the centralized entity at the time of device setup).

As shown, the process 1200 begins by sending (at 1205) an initial request to start the combined authorization and synchronization group joining process. In some embodiments, the requesting device sends the message to a specific device with which it pairs for the combined authorization process with input on the accepting device, rather than to all of the devices. In this case, the requesting device has not begun the authentication process with the central authentication servers and thus does not yet know the list of devices that are members of the user account. In this case, the initial request is not part of the PAKE, but instead serves to indicate the presence of the requesting device and calls the accepting device to begin the key exchange process. The process then receives (at 1210) an initial key exchange request message. In this case, the accepting device acts as the key exchange "client", and thus sends the client public key value A to the requesting device.

The process 1200 then generates generates and displays (at 1215) a randomized code not derivable or reproducible by the centralized authentication entity. In some embodiments, the messages are sent through the centralized authentication servers (that authenticates the login credentials for the centralized entity), and thus (i) a PAKE is used to avoid man-in-the-middle attacks and (ii) a random code is generated in such a way as to preclude the centralized authentication entity from using the code, combined with knowledge of the user account name and password, to join the synchronization group and receive access to the user's secure data. In some embodiments, as a further security measure, the requesting device performing the process 1200 requires the user to input a device passcode before displaying a random code at 1215 (or to perform the process at time of device setup).

In addition to generating and displaying the randomized code, the process 1200 sends (at 1217) a message to the accepting device requesting the randomized code (or requesting proof of the code). In some embodiments, this message includes a second ("server") public key value B for the PAKE, calculated as described above. This message prompts the accepting device to display an input dialog for the user to input the code displayed by the requesting device in some embodiments (in other embodiments, the accepting device displays the input dialog irrespective of whether the message is actually received from the requesting device), and send back either the input code itself or data derived from the code that can be used as proof that the code was input correctly.

After sending the challenge message to the accepting device, the requesting device awaits a message from the accepting device. As shown, the process receives (at 1220) a message from the accepting device with a proof of the input code (e.g., a value derived from the input code). This is the third PAKE message in the sequence. In some embodiments (not shown in these diagrams), the requesting device determines whether C=C' by calculating the same value. In other embodiments (as shown here), this is left to the accepting device, which ensures that the shared keys are the same. As such, the process sends (at 1222) a confirmation of the shared key generated using C (e.g., a hash of the key or some other value that can be used by the accepting device to verify the key).

The device then awaits to receive the next response from the accepting device, which also has to generate the shared key on its own end and verify that the code is correct. As shown, the process determines (at 1225) whether an error message was received. When the user inputs the code incorrectly into the accepting device and this does not match the code generated by the requesting device at 1215 more than a threshold number of times, then the accepting device returns an error message in some embodiments. Upon receiving this error message, the process returns to 1215 to generate and display a new code, then send a new PAKE challenge message. In some embodiments, the error message (as well as a new initial PAKE message) is only sent by the accepting device if more than a threshold number of attempts are made at the previous code; before this threshold is reached, the accepting device simply prompts the user again for the code.

However, assuming no error message is received, the device also determines (at 1230) whether a message with an encrypted second factor authentication code has been received from the accepting device (i.e., the device to which the input code was sent at 1220). This message is only received if the code is entered correctly on the accepting device. The second factor authentication code, in some embodiments, is similar to the code displayed by the requesting device, but is reproducible by the authentication servers. This second factor authentication code is generated based on seed data known to the central authentication service, and thus differs from the random code entered by the user. The seed data is specific to the accepting device, and in some embodiments the code generated from the seed data varies randomly over time in a deterministic manner reproducible by the central authentication entity.

If neither an error message nor a message with the second factor authentication code is received, the process 1200 returns to 1225 (i.e., continues to wait for a reply). One of ordinary skill will recognize that this is a conceptual representation of the process performed by the requesting device. For instance, the requesting device will actually just enter a wait state in some embodiments, and react to receiving either an error message or a second factor authentication code, rather than making repeated determinations as to whether one has been received.

Once the requesting device receives the second factor authentication code, the process 1200 uses (at 1235) the received second factor authentication code to authorize itself with the central entity (e.g., the cloud services entity). In some embodiments, the requesting device uses the newly received code as an authentication factor to prove that the user of the requesting device is in possession of at least one trusted device associated with the account.

Next, having been authorized with the central authentication server, the requesting device would normally generate an application for the synchronization group (as in the process 900 above). However, as described above by reference to FIG. 11, the requesting device of some embodiments is not able to generate a complete application yet, because it does not have either the account password or the private key derived from the account password. Accordingly, the process 1200 sends (at 1240) its device identity (via the secure PAKE channel) to the accepting device, without any signatures.

The process 1200 then receives (at 1245) that device identity signed with the user account private key from the accepting device, also via the secure channel. This enables the process to generate (at 1250) the completed synchronization group application and send this application to the accepting device via the secure channel. In other embodiments, the requesting device sends the application to all devices in the synchronization group, as from this point on the synchronization group joining occurs as is normal. The application includes the signature with the user account private key generated by the accepting device, as well as the signature with the requesting device private key generated at 1250.

Assuming the application is valid (i.e., the signatures prove possession of the requisite private keys, thereby proving possession of the central services account and device passwords/passcodes), the process 1200 receives (at 1255) a completed synchronization group identifier signed by the accepting device using its private device key and with the private user account key. This completed new group identifier adds the requesting device to the synchronization group, and may be sent by the accepting device either through the secure channel or to all of the devices in the group.

2. Accepting Device Process

Figure 13:
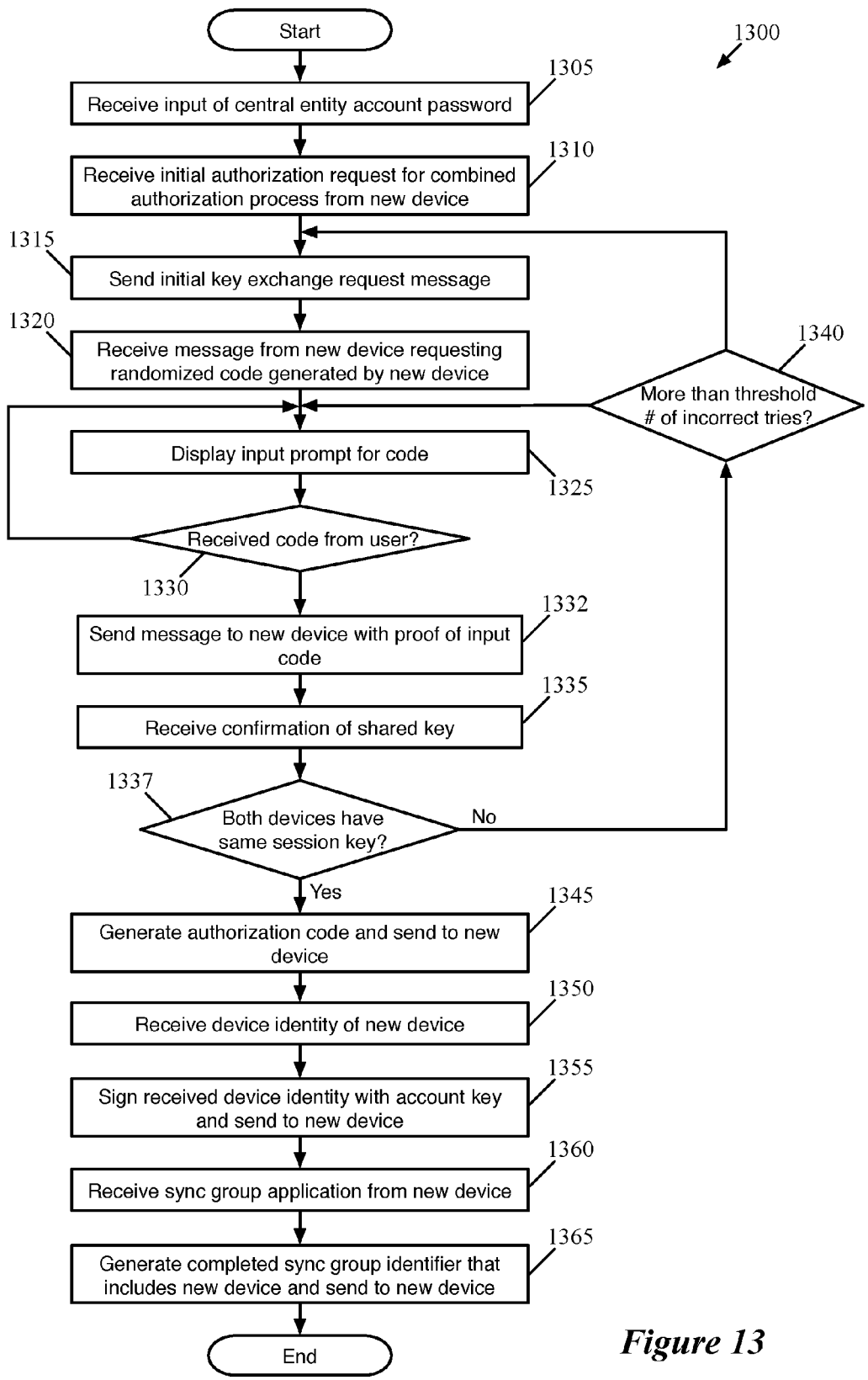
FIG. 13 conceptually illustrates a process of some embodiments performed by an accepting device to allow a requesting device to join a synchronization group of which the accepting device is a part and enable the requesting device to log into a central services account.

FIG. 13 conceptually illustrates a process 1300 of some embodiments performed by an accepting device (e.g., the device 1110) to allow a requesting device to join a synchronization group of which the accepting device is a part and enable the requesting device to log into a central services account. As shown, the process 1300 begins by receiving (at 1305) input of the central services account password. In some embodiments, the user indicates that they want the device to act as an accepting device for a combined authorization process, and are prompted for the password in response. In other embodiments, the device does not actually request the password until receiving the first authorization message (shown here at 1310). If the password is correct, the process can continue, otherwise the accepting device receives indication from the authentication server (not shown) that the password is incorrect and restarts this process.

The process 1300 then receives (at 1310) an initial request for a combined authorization and group joining process from a new device. As noted above, the new device may be a brand new device for the user, or the user may have reset the device operating system, such that the device is effectively new and must rejoin the synchronization group and central services account. As noted above, in some embodiments this message is not a part of the PAKE, but rather allows the new device to announce itself and specify that it wants to join the synchronization group and be authorized with the central services account.

Because the accepting device will be acting as the "client" with respect to the key exchange protocol, the process 1300 sends (at 1315) an initial key exchange request message (i.e., the first PAKE message). As described above, in some embodiments the accepting device calculates a first value A (a client public key value) and sends this value to the requesting device. As a result, the process receives (at 1320) a message from the requesting device requesting a randomized code value that has been generated by the new device. In some embodiments the received request message includes the second ("server") public key value B for the PAKE, calculated by the new device as described above.

In response to receiving the second PAKE message challenging for the code, the process 1300 displays (at 1325) an input prompt for a code (e.g., a box into which the user can type the code, whether through a keyboard, touchscreen, or other input device), and waits for the user to provide a code attempt as input. Some embodiments display this input prompt irrespective of whether the second PAKE message has been received at 1320, displaying the prompt as soon as the challenge message is sent at 1315. The process determines (at 1330) whether a code has been input, and continues to display the prompt (at 1325) until such input is received (or until the user cancels the operation, which is not shown in the flow chart). Though shown as a determination (at 1330), one of ordinary skill will recognize that some embodiments do not make such a repeated determination operation, but instead enter a wait state until the user enters the code, which prompts subsequent operations of the device.

Once the user has entered a code through the input prompt, the process 1300 sends (at 1332) a message to the new device that includes a proof of the code input by the user (e.g., a value derived from this code, such as a hash). This message also serves as the third message of the key exchange. However, because the accepting device should ultimately verify whether to allow the requesting device into the synchronization group and central services account, the requesting device sends a key confirmation message. Accordingly, the process receives (at 1335) a message with confirmation of the shared key.

Based on this, the process 1300 determines (at 1337) whether both devices have generated the same shared key, which effectively determines whether the accepting device has received a correct input of the code (i.e., the code displayed by the requesting device). Because the accepting device does not have the actual random value generated by the requesting device (it only knows the value input by the user), in some embodiments the process confirms that the shared key being used by the requesting device is correct with respect to the key generated by the accepting device from the input code.

When the accepting device determines that the input code does not match the code generated by the requesting device, the process determines (at 1340) whether the code has been input incorrectly more than a threshold number of times. Some embodiments only allow the user to make a certain number of attempts (e.g., 2, 3, 5, 10, etc.) at inputting a particular generated code, so as to eliminate brute force guessing at the code. As such, if the accepting device has received more than the threshold number of attempts to input the code, the process returns to 1315 to send a new second PAKE message to the requesting device, challenging for a new randomized code. Some embodiments also send an error message to the requesting device, indicating that a new code is required. However, if the number of attempts at the current code is less than the threshold amount, the process returns to 1325 to display the prompt and receive another attempt to input the code.

On the other hand, if the user has input the code correctly on the accepting device, the accepting device proceeds based on the premise that the user has proven possession of both devices and the centralized services account password. Thus, the process 1300 generates (at 1345) a randomized code reproducible by the centralized entity, and sends this new randomized code to the new (requesting) device for use in authenticating the requesting device with the centralized entity. As described above, in some embodiments the accepting device encrypts this randomized code with the shared session key K or a portion of the shared key used for messages from the accepting device to the requesting device, before sending the code.

The randomized code generated at 1345 is also referred to as a second factor authentication code because it is used, along with the username and password of the centralized services account (the first authentication factor), to authenticate the device with the centralized services entity. The second factor authentication code, in some embodiments, is similar to the code generated by the requesting device, but is reproducible by the authentication servers. This second factor authentication code is generated based on a seed data known to the central authentication service, and thus differs from the first random code that is not derivable by the centralized entity. The seed data is specific to the device, and in some embodiments the code generated from the seed data varies randomly over time in a deterministic manner reproducible by the central authentication entity.

Once the requesting device receives this code, it can authenticate itself with the central authentication servers as described above. Once this authentication is complete, the requesting device turns to joining the synchronization group. However, in this case, the requesting device does not have the account password, and thus cannot generate the user account private key. As such, the process 1300 only receives (at 1350) the public identity of the requesting device via the secure PAKE channel. This public device identity is not signed as of yet, as described above.

The process 1300 signs (at 1355) the received requesting device identity with the user account key and sends this signed device identity back to the requesting device, again via the secure PAKE channel using the shared key K. This enables the requesting device to generate a complete synchronization group application, because it can add the signature with its own device key.

Accordingly, the process 1300 receives (at 1360) the completed synchronization group application from the requesting device. By now, the application is fully signed by both the private device key of the requesting device and the private user account key, as the requesting device has effectively used the secure PAKE channel to offload to the accepting device the operations for which the account password is required, without needing to ever have possession of the password. The application may be sent by the requesting device via the secure PAKE channel in some embodiments, or via the standard mechanism that sends the application to all group members (as, from this point on, the application process proceeds as normal).

Finally, the process 1300 generates (at 1365) a completed synchronization group identifier that includes the new requesting device and sends this completed group identifier to the new requesting device (again, either via the secure PAKE channel or through the normal mechanism that notifies all devices in the group). The process 1300 then ends. As described above, the completed (properly signed) group identifier includes a list of the devices in the group as well as a new generation count (determined by incrementing the previous generation count for the group), as well as both a signature using the private key of one of the devices already in the group (the accepting device in this case) and a signature using the private user account key.

IV. Device Software Architecture

Figure 14:
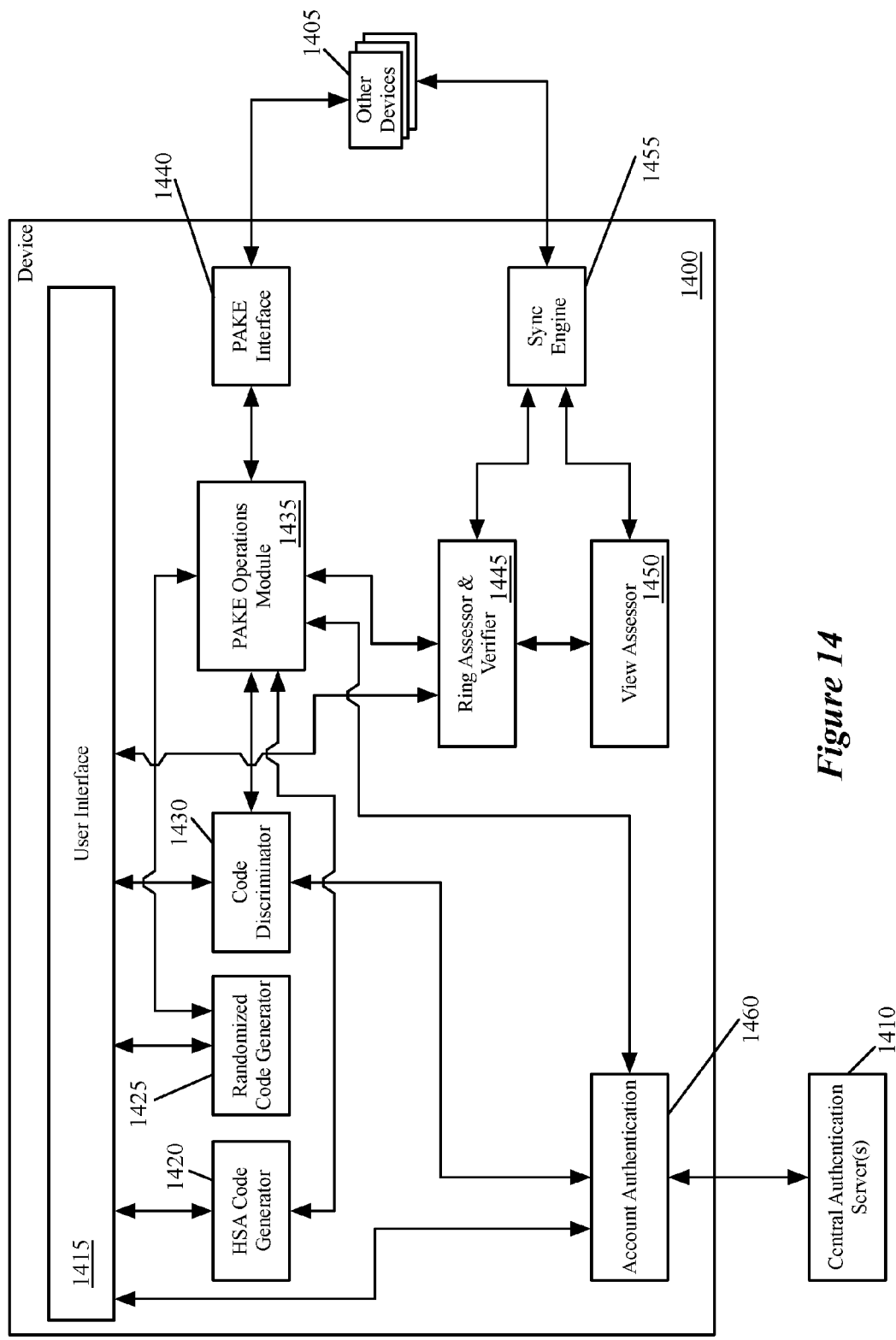
FIG. 14 conceptually illustrates the software architecture of a device of some embodiments that can act as either an accepting device or requesting device for the combined cloud services account authorization and synchronization group joining process.

FIG. 14 conceptually illustrates the software architecture of a device 1400 of some embodiments that can act as either an accepting device or requesting device for the combined cloud services account authorization and synchronization group joining process of some embodiments. In addition, the device 1400 is also capable of providing second factor authentication codes as an offline accepting device or performing an authentication-only process to log into the cloud services account without joining a synchronization group. This figure also illustrates a set of other devices 1405 that are associated with the same centralized services account (i.e., with the same user), as well as a set of central authentication servers 1410 for the centralized services (e.g., a cloud services platform). These devices may be any different type of electronic device that is capable of storing data and communicating with a network. For instance, these devices may include smartphones, tablets, laptop and/or desktop computers, smart watches, set top boxes (either separate from or integrated into a television), virtual devices operating on another device (e.g., virtual machines), etc.

As shown, the software architecture of the device 1400 (as relates to the authentication and synchronization functions) includes a user interface 1415, a HSA code generator 1420, a randomized code generator 1425, a code discriminator 1430, a PAKE operations module 1435, a PAKE interface 1440, a ring assessor & verifier module 1445, a view assessor 1450, a synchronization engine 1455, and an account authentication module 1460. Though not shown, the device 1400 also includes various operating system level functions, including one or more networking modules that enable the connections with the other devices 1405 and the central authentication servers 1410, a display module for outputting the user interface to a display (which may be integrated with the device or be a separate device), and one or more input modules for receiving user input (e.g., through a touchscreen, cursor controller, keyboard, touchpad, etc.).

The user interface 1415 enables the user to interact with the device through these one or more input devices. The user interface, in some embodiments, is responsible for generating the display output to the display device, which allows the user to (i) input authentication credentials, such as a username and password, (ii) view both codes for the combined account authorization and synchronization group joining process as well as codes only used for second factor authentication, and (iii) input these codes when viewed on another device (among numerous other interactions available through the user interface of some embodiments).

The HSA code generator 1420 and the randomized code generator 1425 provide different types of codes to the user interface depending on the situation. For example, the HSA code generator 1420 provides second factor authentication codes. When the user requests such a code through the user interface 1415, the HSA code generator 1420 generates a code and provides this to the user interface for display to the user. In addition, when the device 1400 is acting as an accepting device for the combined process, the PAKE operations module 1435 of some embodiments requests a code from the HSA code generator 1425 once the requesting device has validated a randomized code. The HSA code generator 1425 generates codes according to seed data that is also known to the central authentication servers 1460, such that these codes can be verified when input on another device.

The randomized code generator 1425 generates randomized codes for the combined account verification and authorization process. When either the user (through the UI 1415) or the PAKE operations module 1435 (after receiving a first PAKE message from a requesting device) specify for the randomized code generator 1425 to generate a random code, the generator 1425 generates a code and provides this information to the user interface for display to the user. The code is also provided to the PAKE operations module 1435 so that it can be used in the various PAKE-related calculations and key generation described above, and so that a response from the other device with proof of the generated code can be verified (or, so that the proof of the displayed code can be sent to the accepting device, when the requesting device is generating the code). In some embodiments, the randomized codes are generated based on data not reproducible by the central authentication servers or any other device.

The code discriminator 1430 operates on codes input through the user interface 1415 when the device 1400 is acting as a requesting device to attempt to gain access to the central services account and/or the synchronization group. When the user inputs a code through the UI 1415, the code discriminator 1430 of some embodiments determines whether the code is a combined process code or a second factor authentication code (i.e., which code generator on an accepting device generated the input code). In some embodiments, the code discriminator performs the checksum calculations as described above by reference to FIG. 7 in order to determine which type of code is input. If the code can be confidently determined as a second factor authentication code, the code discriminator passes the data to the account authentication module 1460 for communication with the central authentication server 1410. However, if the code discriminator 1430 determines that the input code is a combined process code, then the code is passed to the PAKE operations module 1435 so that a proof of the code can be generated and sent to the accepting device as the second PAKE message.

The PAKE operations module 1435 of some embodiments performs the various operations for the combined account authorization and synchronization group joining process, as either a requesting device or an accepting device. As a requesting device, the PAKE operations module generates the initial PAKE message with the client public key A, extracts data from the second PAKE message with the server public key B, computes the shared session key, and generates the third PAKE message, which includes generating proof of the code input through the user interface 1415. In addition, in some embodiments the PAKE operations module 1435 (or a separate encryption/decryption function using the key generated by the PAKE operations module 1435) encrypts the peer identity and decrypts the second factor authentication code to pass the decrypted code to the account authentication module 1435.

As an accepting device, the PAKE operations module 1435 receives the initial PAKE message and extracts the client public key A, generates the second PAKE message including the server public key B (based in part on a code received from the randomized code generator 1425), computes the shared session key, and verifies the proof of the code sent with a received third PAKE message. In addition, in some embodiments the PAKE operations module 1435 (or a separate encryption/decryption function using the key generated by the PAKE operations module 1435) decrypts the peer identity for automatic approval and passes this information to the ring assessor and verifier 1445, and encrypts a second factor authentication code (received from the HSA code generator 1420) to send to the requesting device. The PAKE interface 1440 handles the sending and receiving of these PAKE messages, as well as any necessary error messages, in some embodiments.

The account authentication module 1460 handles the account authentication process with the central authentication server. The account authentication module 1460 receives username and password information from the user interface, and in some embodiments provides information about the other devices 1405 received from the server, so that the PAKE operations module 1435 and interface 1440 can send the PAKE messages to the correct devices. In other embodiments, the PAKE interface is actually part of the authentication module 1460 and the entire PAKE process takes place through the set of authentication servers 1410. The authentication module 1460 also receives a second factor authentication code (either through the user interface 1415 for an account authentication only process or through the PAKE operations module 1435 in the case of the combined process), and sends this code to the central authentication servers 1410 to complete the account authentication process.

The ring assessor and verifier 1445 of some embodiments handles the synchronization group application generation (for requesting devices) and verification (for accepting devices). In some embodiments, the devices use both verification sub-groups and synchronization sub-groups, also referred to as rings and views. Devices join a ring (verification sub-group) by applying to be in the ring and by proving certain requirements for the ring. Devices can then participate in views based on their ring membership, with different views synchronizing different secure data. In the examples described above, the synchronization group to which the requesting device applies as part of the combined account authorization and group joining process is actually a ring, membership in which allows participation in a particular view for sharing at least some of the user's secure data. The requirements for the particular ring entail both possession of the account credentials and user approval on the accepting device. In this case, the user approval is accepted based on the user entering the randomized code on the requesting device and the PAKE module verifying this code.

The ring assessor and verifier 1445 on a requesting device generates the ring application using the device's peer identity and the private signing keys derived from the account password and device-specific seed data. On the accepting device, the ring assessor and verifier 1445 verifies these signatures, and automatically accepts the application (so long as the signatures are verified) based on the peer identity being the same as that received for auto-acceptance from the PAKE operations module 1435. In addition, the ring assessor and verifier of some embodiments may generate applications (and verify such applications) for all sorts of rings.

In the cases in which the password (and random code) is only input on one of the devices, the ring assessor and verifier 1445 also generates the partial application (in the case in which the password is input on only the accepting device) or the partial synchronization group identifier (in the case in which the password is input on only the requesting device. The ring assessor and verifier 1445 uses the PAKE operations module 1435 in some embodiments to encrypt/decrypt these partial applications and/or group identifiers that are sent across the secure PAKE channel.

The view assessor receives ring status information for both the device 1400 and the other devices 1405, and identifies in which views each of the devices participate. The view assessor provides this data to the synchronization engine 1455, which handles the synchronization of the user's secure data with the other devices 1405 according to the mapping of views to devices provided by the view assessor 1450. In the case in which there is only one ring (and therefore one view) for all the devices associated with an account, the ring assessor and verifier 1445 and the view assessor 1450 may be a single synchronization group assessor and verifier module. The rings and views of some embodiments are described in greater detail in in U.S. Provisional Patent Applications 62/168,893 and 62/172,127, as well as U.S. Patent Publication 2014/0281540 and Ser. No. 14/872,013, all of which are incorporated by reference above.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 15:
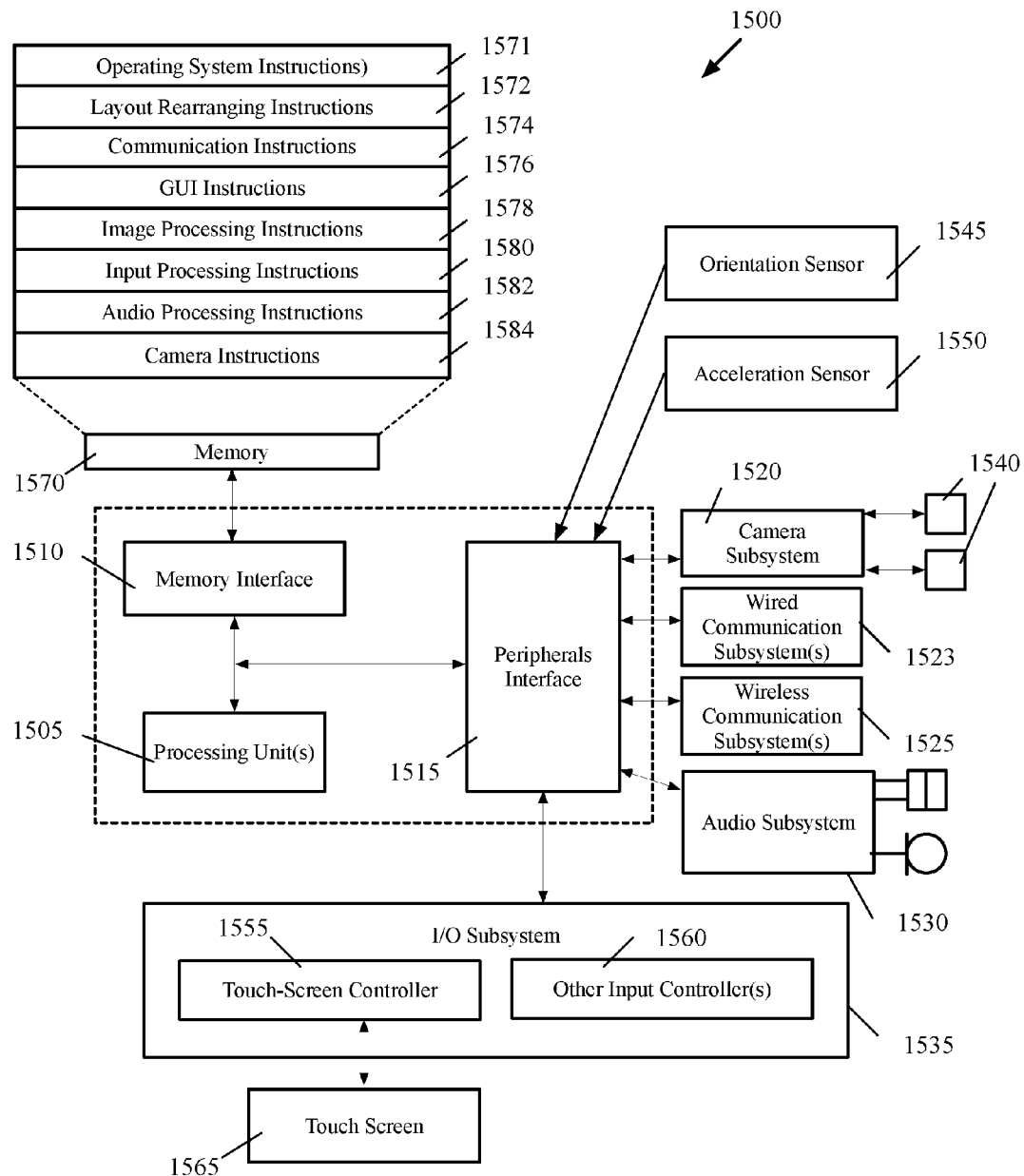
FIG. 15 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 15 is an example of an architecture 1500 of such a mobile computing device. As shown, the mobile computing device 1500 includes one or more processing units 1505, a memory interface 1510 and a peripherals interface 1515.

The peripherals interface 1515 is coupled to various sensors and subsystems, including a camera subsystem 1520, a wired communication subsystem(s) 1523, a wireless communication subsystem(s) 1525, an audio subsystem 1530, an I/O subsystem 1535, etc. The peripherals interface 1515 enables communication between the processing units 1505 and various peripherals. For example, an orientation sensor 1545 (e.g., a gyroscope) and an acceleration sensor 1550 (e.g., an accelerometer) is coupled to the peripherals interface 1515 to facilitate orientation and acceleration functions.

The camera subsystem 1520 is coupled to one or more optical sensors 1540 (e.g., a charged coupled device (CCD) optical sensor, a complementary metal-oxide-semiconductor (CMOS) optical sensor, etc.). The camera subsystem 1520 coupled with the optical sensors 1540 facilitates camera functions, such as image and/or video data capturing. The wired communication subsystem 1523 and wireless communication subsystem 1525 serve to facilitate communication functions.

In some embodiments, the wireless communication subsystem 1525 includes radio frequency receivers and transmitters, and optical receivers and transmitters (not shown in FIG. 15). These receivers and transmitters of some embodiments are implemented to operate over one or more communication networks such as a GSM network, a Wi-Fi network, a Bluetooth network, etc. The audio subsystem 1530 is coupled to a speaker to output audio (e.g., to output voice navigation instructions). Additionally, the audio subsystem 1530 is coupled to a microphone to facilitate voice-enabled functions in some embodiments.

The I/O subsystem 1535 involves the transfer between input/output peripheral devices, such as a display, a touch screen, etc., and the data bus of the processing units 1505 through the peripherals interface 1515. The I/O subsystem 1535 includes a touch-screen controller 1555 and other input controllers 1560 to facilitate the transfer between input/output peripheral devices and the data bus of the processing units 1505. As shown, the touch-screen controller 1555 is coupled to a touch screen 1565. The touch-screen controller 1555 detects contact and movement on the touch screen 1565 using any of multiple touch sensitivity technologies. The other input controllers 1560 are coupled to other input/control devices, such as one or more buttons. Some embodiments include a near-touch sensitive screen and a corresponding controller that can detect near-touch interactions instead of or in addition to touch interactions.

The memory interface 1510 is coupled to memory 1570. In some embodiments, the memory 1570 includes volatile memory (e.g., high-speed random access memory), non-volatile memory (e.g., flash memory), a combination of volatile and non-volatile memory, and/or any other type of memory. As illustrated in FIG. 15, the memory 1570 stores an operating system (OS) 1571. The OS 1571 includes instructions for handling basic system services and for performing hardware dependent tasks.

The memory 1570 also includes communication instructions 1574 to facilitate communicating with one or more additional devices (e.g., for peer-to-peer data sharing, or to connect to a server through the Internet for cloud-based data sharing); graphical user interface instructions 1576 to facilitate graphic user interface processing; image processing instructions 1578 to facilitate image-related processing and functions; input processing instructions 1580 to facilitate input-related (e.g., touch input) processes and functions; audio processing instructions 1582 to facilitate audio-related processes and functions; and camera instructions 1584 to facilitate camera-related processes and functions. The instructions described above are merely exemplary and the memory 1570 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 15 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 15 may be split into two or more integrated circuits.

B. Computer System

Figure 16:
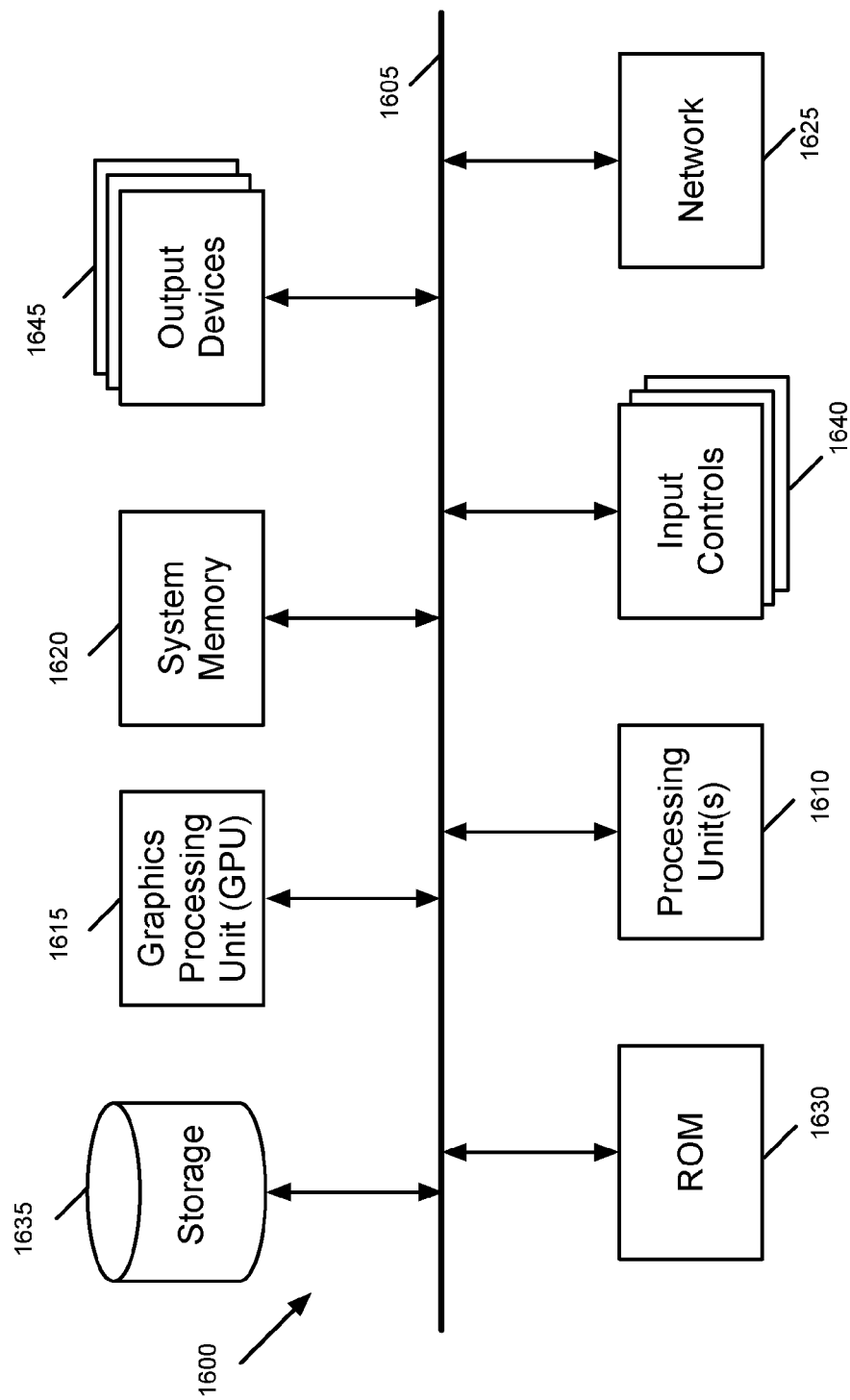
FIG. 16 conceptually illustrates another example of an electronic system with which some embodiments of the invention are implemented.

FIG. 16 conceptually illustrates another example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive, integrated flash memory) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet), or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 5, 7, 9, 10, 12, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first device, a method for joining a group of related devices:
   receiving input of (i) a password corresponding to authorization of a particular account with a centralized entity and (ii) a code generated by a second device already established in the group of related devices;
   when the second device determines that the code input on the first device matches the generated code, receiving an authentication code from the second device, the authentication code being associated with authorizing the first device with the centralized entity as a valid device for the particular account;
   using (i) the password input on the first device and (ii) information regarding the first device to generate an application to the group of related devices;
   after sending the application to the second device, receiving information from the second device that enables the first device to add itself to the group of related devices, wherein the second device verifies the generated application but cannot add the first device to the group of related devices because it does not store the password; and
   using the information received from the second device to join the group of related devices.

2. The method of claim 1 further comprising, after receiving input of the password and prior to receiving the input of the code:
   sending a first authentication message to the second device; and
   receiving a second authentication message from the second device requesting indication that the code has been entered on the first device.

3. The method of claim 1 further comprising, after receiving the code generated by the input of the code:
   generating a set of keys from the input code; and
   using the generated set of keys to send a proof of the input code to the second device.

4. The method of claim 3, wherein the second device generates the set of keys from the code it generates, wherein the sets of keys are used by the first and second devices to create a secure channel over which the authentication code is sent to the first device.

5. The method of claim 4, wherein the secure channel is used to send the generated application from the first device to the second device and to receive the information from the second device that enables the first device to add itself to the group of related devices.

6. The method of claim 1 further comprising using the authentication code to authorize the first device with the centralized entity as a valid device for the particular account.

7. The method of claim 1 further comprising sending the generated application to the second device.

8. The method of claim 1, wherein using the password and the information regarding the first device to generate the application comprises signing the information regarding the first device with a private key generated from the password.

9. The method of claim 1, wherein the information received from the second device comprises a generation count for a next generation of the group of related devices and a signature based on a private key of the second device.

10. The method of claim 9, wherein using the information received from the second device to join the group of related devices comprises:
    generating an approval of the addition of the first device to the group of related devices, the approval comprising a list of the related devices and the generation count with (i) the signature based on the private key of the second device and (ii) a signature based on a private key of the particular account based on the password; and
    sending the generated approval to the group of related devices.

11. A non-transitory machine readable medium storing a program which when executed by at least one processing unit of a first device joins the first device with a group of related devices, the program comprising sets of instructions for:
    generating and displaying a code for input on a second device that is already established in the group of related devices;
    when a code input on the second device matches the code displayed on the first device, receiving an authentication code from the second device, the authentication code being associated with authorizing the first device with a centralized entity as a valid device for a particular account with a centralized entity, without using any input of a password for the account on the first device;
    receiving information from the second device required by the first device to generate an application to join the group of related devices, wherein the information comprises a signature generated by the second device from the password, wherein the password is input on the second device;

generating the application using the information about the first device and the information received from the second device; and sending the application to join the group of related devices to the second device, wherein the second device approves the first device joining the group of related devices.

12. The non-transitory machine readable medium of claim 11, wherein the program further comprises sets of instructions for:

sending a first authentication message to the second device prior to displaying the code; and receiving a second authentication message from the second device requesting indication of the code displayed on the first device.

13. The non-transitory machine readable medium of claim 12, wherein the code is generated and displayed in response to receiving the second authentication message.

14. The non-transitory machine readable medium of claim 11, wherein the program further comprises sets of instructions for:

generating a set of keys from the displayed code; and using the generated set of keys to send data regarding the displayed code the second device.

15. The non-transitory machine readable medium of claim 14, wherein the second device generates a corresponding set of keys from the code input on the second device, uses the corresponding set of keys to decrypt the data regarding the displayed code received from the first device, and compares data regarding the code input on the second device to the decrypted data regarding the displayed code to determine whether the code input on the second device matches the code displayed on the first device.

16. The non-transitory machine readable medium of claim 14, wherein the second device generates a corresponding set of keys from the code input on the second device, wherein the sets of keys are used by the first and second devices to create a secure channel over which the authentication code is sent to the first device.

17. The non-transitory machine readable medium of claim 16, wherein the secure channel is used to receive the information required by the first device to generate the application from the first device and to send the application to the second device.

18. The non-transitory machine readable medium of claim 11, wherein the program further comprises a set of instructions for sending information regarding the first device to the second device prior to receiving the information required by the first device to generate the application.

19. The non-transitory machine readable medium of claim 18, wherein the information required by the first device comprises the information regarding the first device signed using a private key for the particular account generated based on the password.

20. The non-transitory machine readable medium of claim 19, wherein the application comprises the information regarding the first device signed (i) using the private key for the particular account generated based on the password and (ii) using a private key for the first device.

21. A method comprising:

generating and displaying, by a first device, a code for input on a second device that is already established in a group of related devices;

when a code input on the second device matches the code displayed on the first device, receiving an authentication code from the second device, the authentication code being associated with authorizing the first device with a centralized entity as a valid device for a particular account with a centralized entity, without using any input of a password for the account on the first device;

receiving information from the second device required by the first device to generate an application to join the group of related devices, wherein the information comprises a signature generated by the second device from the password, wherein the password is input on the second device;

generating the application using the information about the first device and the information received from the second device; and sending the application to join the group of related devices to the second device, wherein the second device approves the first device joining the group of related devices.

* * * * *